United States Patent
Machida

(10) Patent No.: US 10,670,848 B2
(45) Date of Patent: Jun. 2, 2020

(54) VARIABLE POWER OPTICAL SYSTEM, OPTICAL DEVICE AND METHOD FOR MANUFACTURING VARIABLE POWER OPTICAL SYSTEM

(71) Applicant: Nikon Corporation, Minato-ku, Tokyo (JP)

(72) Inventor: Kosuke Machida, Tokyo (JP)

(73) Assignee: Nikon Corporation, Tokyo (JP)

(*) Notice: Subject to any disclaimer, the term of this patent is extended or adjusted under 35 U.S.C. 154(b) by 380 days.

(21) Appl. No.: 15/004,879

(22) Filed: Jan. 22, 2016

(65) Prior Publication Data
US 2016/0231545 A1 Aug. 11, 2016

Related U.S. Application Data

(63) Continuation of application No. PCT/JP2014/069448, filed on Jul. 23, 2014.

(30) Foreign Application Priority Data

Jul. 29, 2013 (JP) .................................. 2013-157111
Feb. 17, 2014 (JP) .................................. 2014-027494

(51) Int. Cl.
| G02B 15/20 | (2006.01) |
| G02B 15/173 | (2006.01) |
| G02B 27/64 | (2006.01) |
| G03B 13/36 | (2006.01) |
| G02B 13/18 | (2006.01) |

(52) U.S. Cl.
CPC ........... *G02B 15/20* (2013.01); *G02B 15/173* (2013.01); *G02B 27/646* (2013.01); *G03B 13/36* (2013.01); *G02B 13/18* (2013.01)

(58) Field of Classification Search
CPC ........ G02B 15/00; G02B 15/14; G02B 15/16; G02B 15/163; G02B 15/167;
(Continued)

(56) References Cited

U.S. PATENT DOCUMENTS

| 5,880,892 A | 3/1999 | Ohtake |
| 5,956,184 A * | 9/1999 | Sato ..................... G02B 15/173 |
| | | 359/683 |

(Continued)

FOREIGN PATENT DOCUMENTS

| JP | 10-048525 A | 2/1998 |
| JP | 10-268194 A | 10/1998 |

(Continued)

OTHER PUBLICATIONS

English Translation of International Preliminary Report on Patentability from International Patent Application No. PCT/JP2014/069448, dated Feb. 11, 2016.

(Continued)

*Primary Examiner* — Nicholas R. Pasko
*Assistant Examiner* — Ibrahima Diedhiou
(74) *Attorney, Agent, or Firm* — SGPatents PLLC

(57) ABSTRACT

A variable magnification optical system is provided which includes, in order from an object side, a first lens group G1 having positive refractive power, a second lens group G2 having negative refractive power, a third lens group G3 having positive refractive power, a fourth lens group G4, and a subsequent lens group GR. Upon zooming, each of distances between the first lens group G1 and the second lens group G2, between the second lens group G2 and the third lens group G3, between the third lens group G3 and the fourth lens group G4, between the fourth lens group G4 and the subsequent lens group GR is varied, and upon focusing, the third lens group G3 is moved along an optical axis. A predetermined condition is satisfied. Consequently, the optical system enables a focusing lens group to be downsized and made light and also enables high speed auto focusing and quietness upon auto focusing to be realized without increasing the size of a barrel. Variation in aberration upon (Continued)

zooming from a wide-angle end state to a telephoto end state and variation in aberration upon focusing from an infinite distance object to a close distance object are well suppressed. Also, an optical apparatus and a method for manufacturing the variable magnification optical system are provided.

25 Claims, 18 Drawing Sheets

(58) Field of Classification Search
CPC .... G02B 15/173; G02B 15/177; G02B 15/20; G02B 15/22; G02B 27/0025; G02B 27/64; G02B 27/646; G03B 3/10; G03B 5/00; G03B 2205/0007; G03B 13/00; G03B 13/006; G03B 13/02; G03B 13/04; G03B 13/18; G03B 13/24; G03B 13/32; G03B 13/34; G03B 13/36; H04N 5/23248
USPC ....... 359/554, 557, 642, 676, 680, 682–687, 359/693, 695, 740, 900; 396/55, 72
See application file for complete search history.

(56) References Cited

U.S. PATENT DOCUMENTS

| | | | |
|---|---|---|---|
| 2006/0268428 A1* | 11/2006 | Kuroda | G02B 15/173 359/693 |
| 2007/0070521 A1 | 3/2007 | Hayakawa | |
| 2010/0302648 A1 | 12/2010 | Hatada | |

FOREIGN PATENT DOCUMENTS

| | | | |
|---|---|---|---|
| JP | 11-072705 | A | 3/1999 |
| JP | 2004-233750 | A | 8/2004 |
| JP | 2006-301474 | A | 11/2006 |
| JP | 2007-279587 | A | 10/2007 |
| JP | 2010-237453 | A | 10/2010 |
| JP | 2010-276656 | A | 12/2010 |
| JP | 4876509 | B2 | 12/2011 |
| JP | 2012-042549 | A | 3/2012 |
| JP | 2012-212088 | A | 11/2012 |
| JP | 2013-182246 | A | 9/2013 |
| JP | 2015-152809 | A | 8/2015 |

OTHER PUBLICATIONS

International Search Report from International Patent Application No. PCT/JP2014/069448, dated Oct. 21, 2014.

Office Action dated Jan. 8, 2019, in Japanese Patent Application No. 2017-249464.

Office Action dated Jul. 21, 2017, in Japanese Patent Application No. 2013-157111.

Office Action dated Oct. 3, 2017, in Japanese Patent Application No. 2013-157111.

* cited by examiner

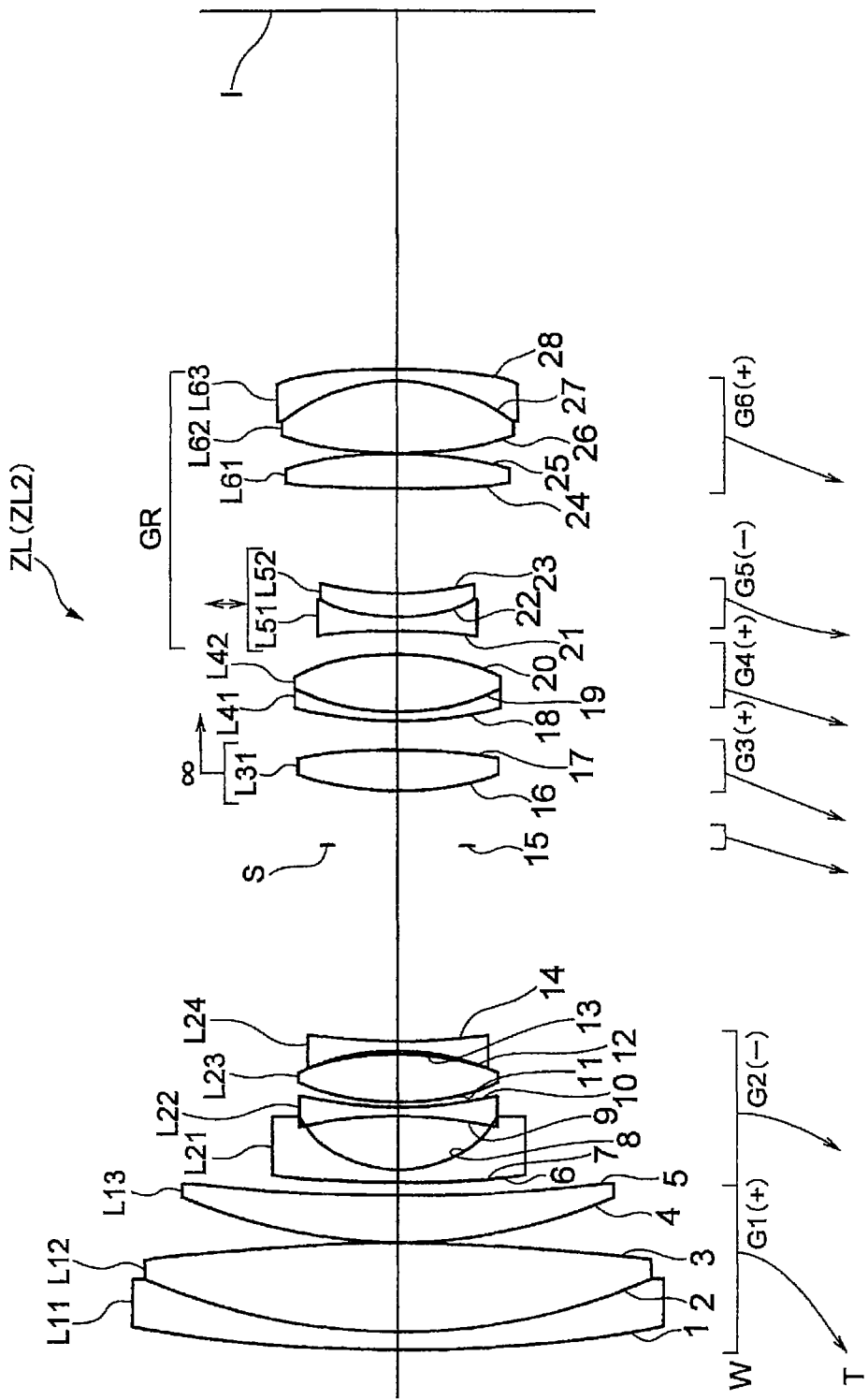

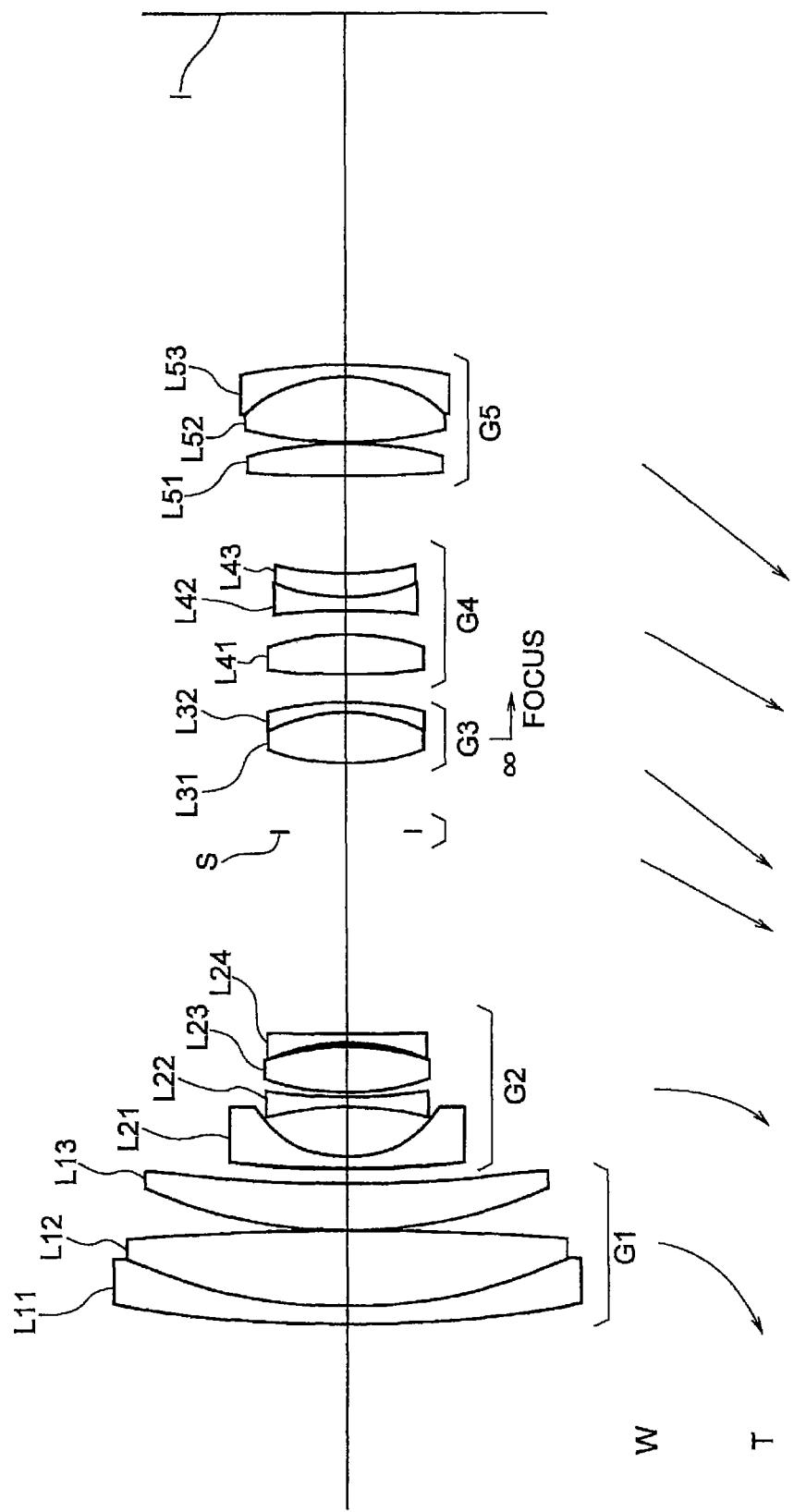

[FIG.16]
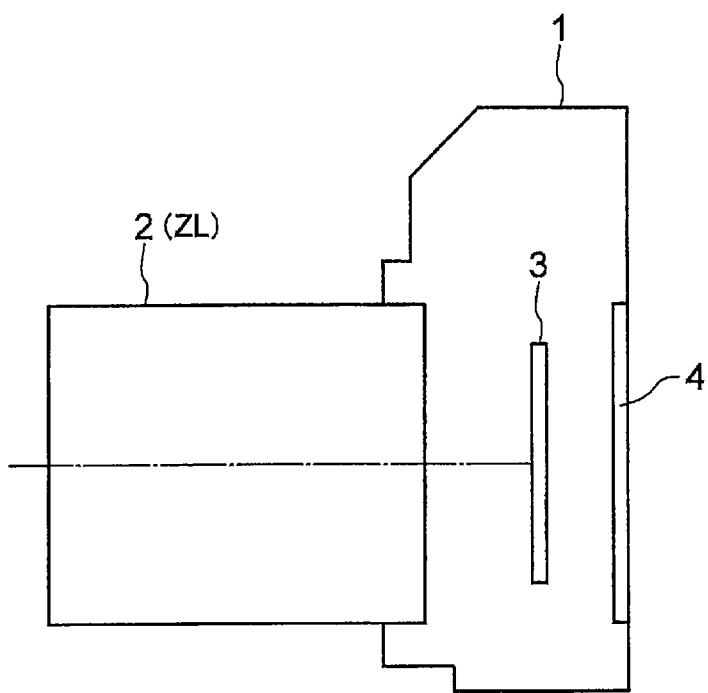

[FIG.17]
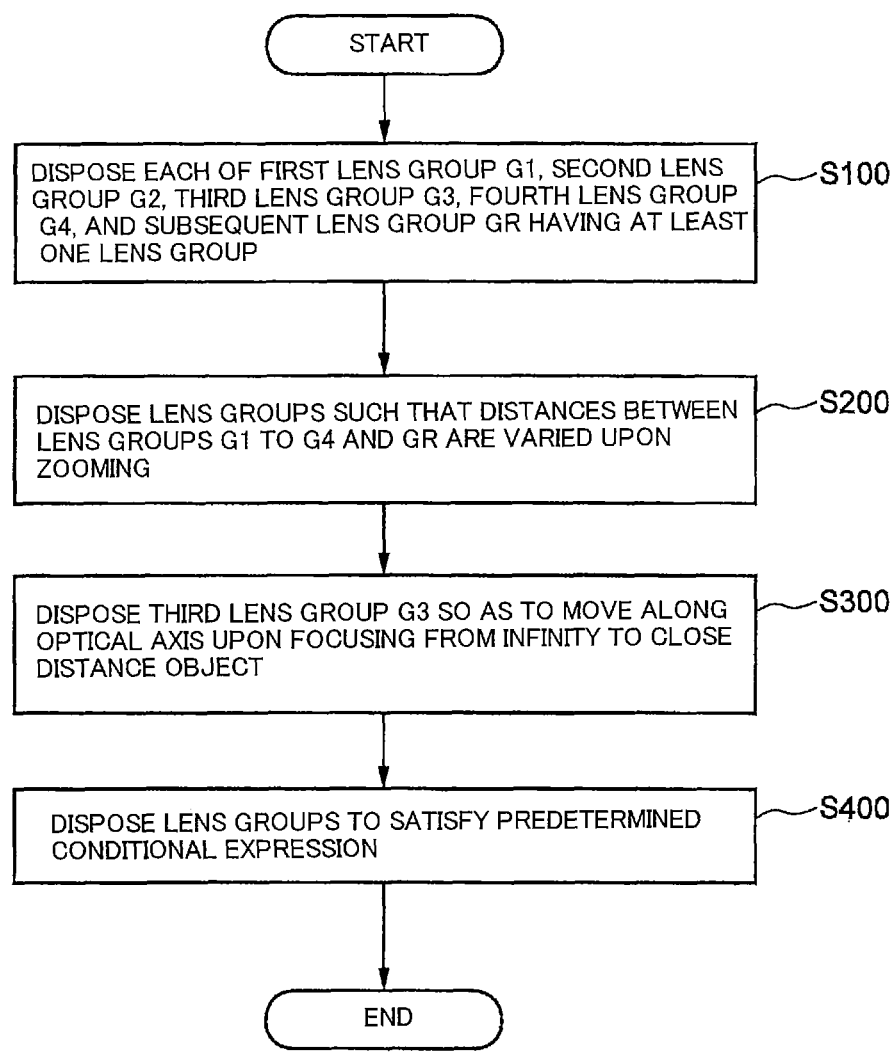

[FIG.18]
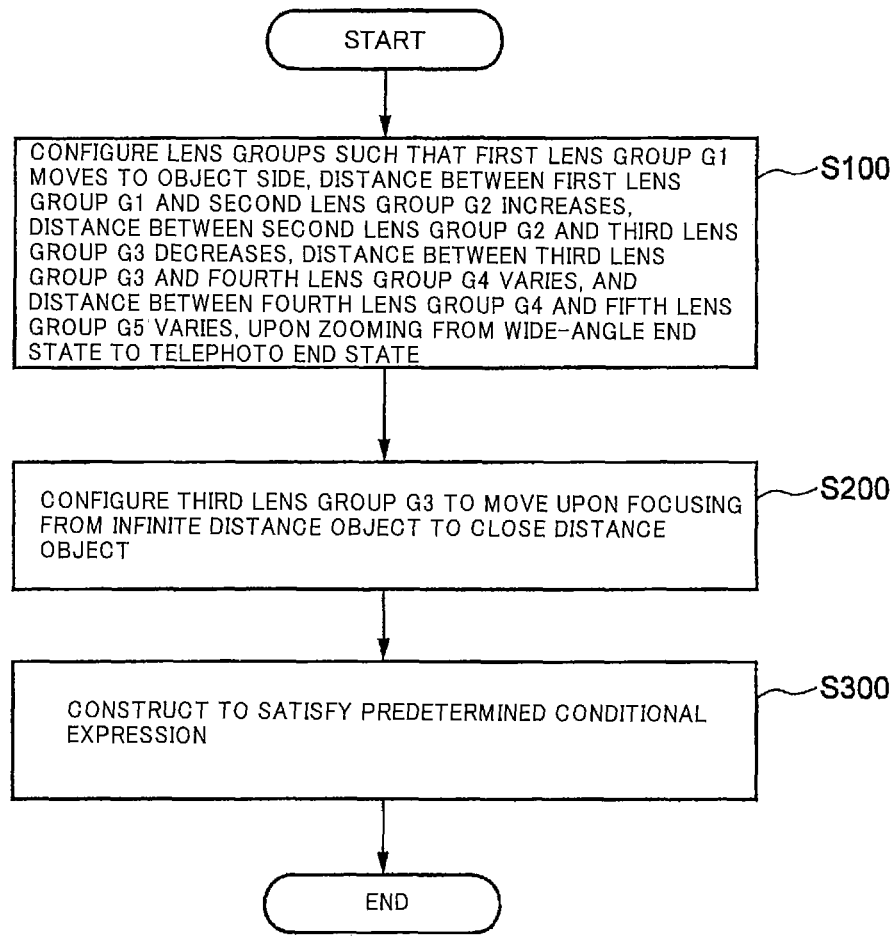

VARIABLE POWER OPTICAL SYSTEM, OPTICAL DEVICE AND METHOD FOR MANUFACTURING VARIABLE POWER OPTICAL SYSTEM

TECHNICAL FIELD

The present invention relates to a variable magnification optical system, an optical device, and a method for producing the variable magnification optical system.

BACKGROUND ART

Conventionally, there have been proposed variable magnification optical systems whose focusing lens group is made lighter because of the introduction of IF, that is, an inner focus system and which are suitable for a photographing camera, an electronic still camera, a video camera or the like (See, for example, Patent Documents 1 and 2 given below).

PRIOR ART REFERENCE

Patent Document

Patent Document 1: Japanese Patent No. 4876509
Patent Document 2: Japanese patent application Laid-Open Gazette No. 2010-237453

SUMMARY OF THE INVENTION

Problems to be Solved by the Invention

However, in the conventional variable magnification optical systems as described above, there was a problem that the focusing lens group was only made light to an insufficient degree for realizing good quietness upon AF, that is, auto focusing. Additionally, since the focusing lens group was heavy in weight, high speed auto focusing requires a larger motor or actuator, and accordingly resulting in a larger barrel.

The present invention is made in view of the above-described problem. It is an object of the present invention to provide a variable magnification optical system that enables the realization of high speed auto focusing (AF) and good quietness upon auto focusing without increasing the size of a barrel, by downsizing the focusing lens group and making the focusing lens group lighter and that can successfully suppress the variation in aberration upon zooming from a wide-angle end state to a telephoto end state and can also successfully suppress the variation in aberration upon focusing from an infinite distance object to a close distance object and also to provide an optical apparatus, and a method for manufacturing the variable magnification optical system.

Means for Solving the Problems

In order to solve the above-mentioned object, according to a first aspect of the present invention, there is provided a variable magnification optical system comprising, in order from an object side:
a first lens group having positive refractive power;
a second lens group having negative refractive power;
a third lens group having positive refractive power;
a fourth lens group; and
a subsequent lens group comprising at least one lens group;

upon zooming from a wide-angle end state to a telephoto end state, a distance between the first lens group and the second lens group being varied, a distance between the second lens group and the third lens group being varied, a distance between the third lens group and the fourth lens group being varied, a distance between the fourth lens group and the subsequent lens group being varied, and when the subsequent lens group comprises a plurality of lens groups, each distance between the plurality of lens groups being varied;

upon focusing from an infinite distance object to a close distance object, the third lens group being moved along an optical axis, and the following conditional expression being satisfied:

$$0.60 < f3/f4 < 1.30$$

where f3 denotes a focal length of the third lens group; and f4 denotes a focal length of the fourth lens group.

Further, in order to solve the above-mentioned object, according to a second aspect of the present invention, there is provided a variable magnification optical system comprising, in order from an object side along an optical axis: a first lens group having positive refractive power; a second lens group having negative refractive power; a third lens group having positive refractive power; a fourth lens group having negative refractive power; and a fifth lens group having positive refractive power; and upon zooming from a wide-angle end state to a telephoto end state, a distance between the first lens group and the second lens group being varied, a distance between the second lens group and the third lens group being varied, a distance between the third lens group and the fourth lens group being varied, a distance between the fourth lens group and the fifth lens group being varied, and the first lens group being moved to an object side;

upon focusing from infinity to a close distance object, the third lens group being moved, and the following conditional expressions being satisfied:

$$0.23 < f3/ft < 0.35$$

$$2.60 < (-f3)/f2 < 3.60$$

where f2 denotes a focal length of the second lens group; f3 denotes a focal length of the third lens group; and ft denotes a focal length of the whole system.

According to the present invention, there is provided an optical apparatus comprising any of the above-mentioned variable magnification optical systems.

Further, there is provided a method for manufacturing a variable magnification optical system according to the first aspect of the present invention, the optical system comprising, in order from an object side: a first lens group having positive refractive power; a second lens group having negative refractive power; a third lens group having positive refractive power; a fourth lens group; and a subsequent lens group comprising at least one lens group; the method comprising the steps of:

disposing the lens groups such that, upon zooming from a wide-angle end state to a telephoto end state, a distance between the first lens group and the second lens group is varied, a distance between the second lens group and the third lens group is varied, a distance between the third lens group and the fourth lens group is varied, a distance between the fourth lens group and the subsequent lens group is varied, and when the subsequent lens group comprises a plurality of lens groups, each distance between the plurality of lens groups is varied;

disposing the third lens group so as to move along an optical axis upon focusing from infinity to a close distance object; and disposing the lens groups such that the following conditional expression is satisfied:

$$0.60 < f3/f4 < 1.30$$

where f3 denotes a focal length of the third lens group; and f4 denotes a focal length of the fourth lens group.

Further, there is provided a method for manufacturing a variable magnification optical system according to the second aspect of the present invention, the optical system comprising, in order from an object side along an optical axis: a first lens group having positive refractive power; a second lens group having negative refractive power; a third lens group having positive refractive power; a fourth lens group having negative refractive power; and a fifth lens group having positive refractive power; the method comprising the steps of:

configuring the lens groups such that upon zooming from a wide-angle end state to a telephoto end state, a distance between the first lens group and the second lens group is varied, a distance between the second lens group and the third lens group is varied, a distance between the third lens group and the fourth lens group is varied, a distance between the fourth lens group and the fifth lens group is varied, and the first lens group is moved toward an object side;

configuring the third lens group so as to move upon focusing from an infinite distance object point to a close distance object point; and constructing the variable magnification optical system so as to satisfy the following conditional expressions:

$$0.23 < f3/ft < 0.35$$

$$2.60 < (-f3)/f2 < 3.60$$

where f2 denotes a focal length of the second lens group; f3 denotes a focal length of the third lens group; and ft denotes a focal length of the whole system in the telephoto end state.

Effect of the Invention

According to the present invention, it is possible to provide a variable magnification optical system which enables the realization of high speed auto focusing and good quietness upon auto focusing without increasing the size of a barrel, by downsizing a focusing lens group and making it lighter and which also enables good suppression of aberration upon zooming from a wide-angle end state to a telephoto end state and good suppression of aberration upon focusing from an infinite distance object to a close distance object. It is also possible to provide an optical apparatus and a method for manufacturing the variable magnification optical system.

BRIEF DESCRIPTION OF THE DRAWINGS

FIGS. 2A, 2B and 2C are graphs showing various aberrations of the variable magnification optical system according to the First Example upon focusing on infinity, in which FIG. 2A shows a wide-angle end state, FIG. 2B shows an intermediate focal length state, and FIG. 2C shows a telephoto end state, respectively.

FIGS. 3A, 3B and 3C are graphs showing various aberrations of the variable magnification optical system according to the First Example upon focusing on a close distance object, in which FIG. 3A shows a wide-angle end state, FIG. 3B shows an intermediate focal length state, and FIG. 3C shows a telephoto end state, respectively.

FIG. 4 is a sectional view showing a lens arrangement of a variable magnification optical system according to a Second Example.

FIGS. 5A, 5B and 5C are graphs showing various aberrations of the variable magnification optical system according to the Second Example upon focusing on infinity, in which FIG. 5A shows a wide-angle end state, FIG. 5B shows an intermediate focal length state, and FIG. 5C shows a telephoto end state, respectively.

FIGS. 6A, 6B and 6C are graphs showing various aberrations of the variable magnification optical system according to the Second Example upon focusing on a close distance object, in which FIG. 6A shows a wide-angle end state, FIG. 6B shows an intermediate focal length state, and FIG. 6C shows a telephoto end state, respectively.

FIG. 10 is a view showing a lens arrangement of a variable magnification optical system according to a Fourth Example of the present application.

FIG. 16 is a sectional view showing a configuration of a camera equipped with the above-mentioned variable magnification optical system.

FIG. 17 is a flowchart schematically showing a method for manufacturing the above-mentioned variable magnification optical system.

FIG. 18 is a flowchart schematically showing a method for manufacturing the above-mentioned variable magnification optical system.

EMBODIMENTS FOR CARRYING OUT THE INVENTION (First Embodiment)

Figure 1:
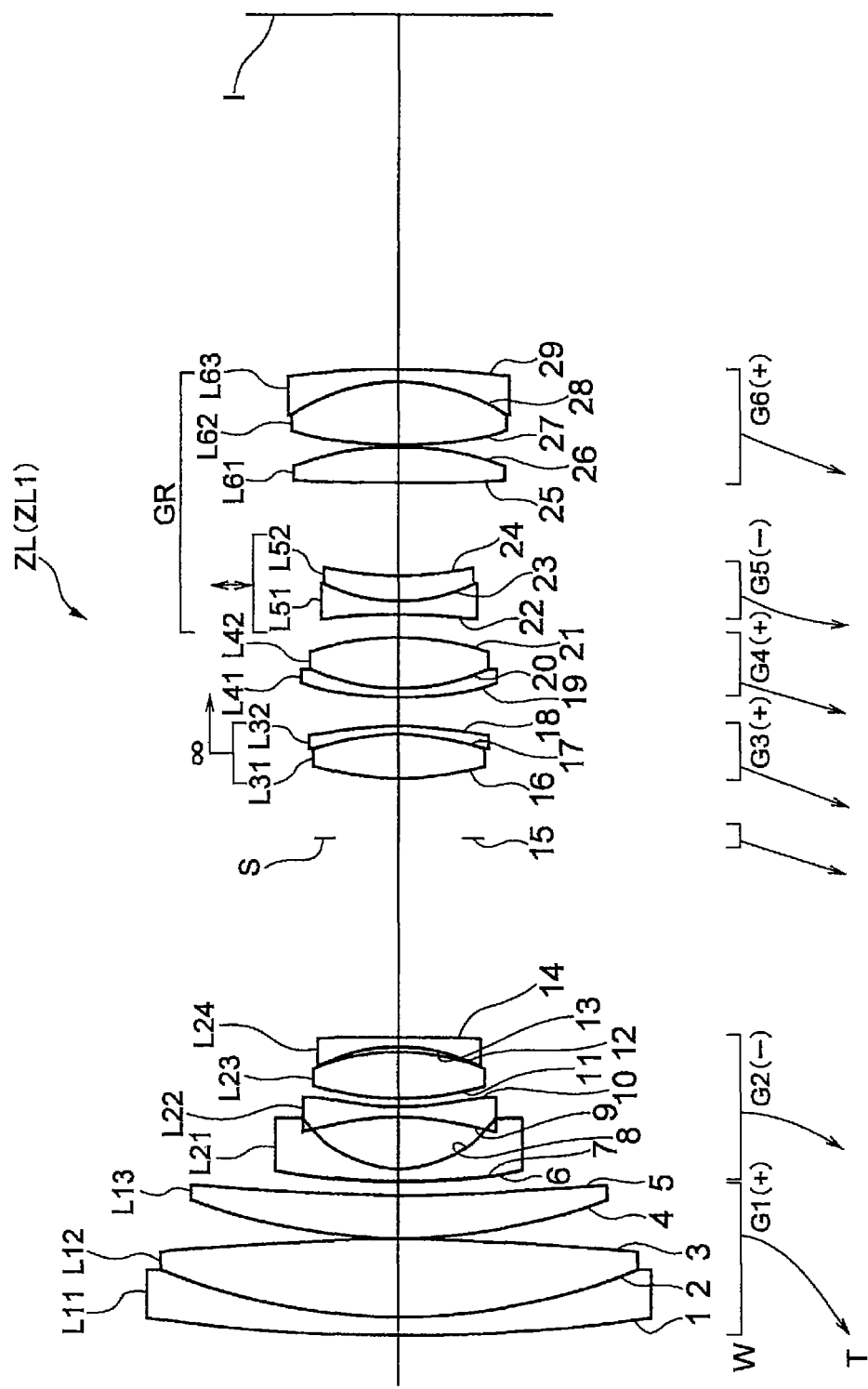
FIG. 1 is a sectional view showing a lens arrangement of a variable magnification optical system according to a First Example.

Preferred embodiments of the present invention are described below with reference to the drawings attached hereto. As shown in FIG. 1, the variable magnification optical system ZL according to the first Embodiment of the present application comprises, in order from an object side: a first lens group G1 having positive refractive power; a second lens group G2 having negative refractive power; a third lens group G3 having positive refractive power; a fourth lens group G4 having positive refractive power; and a subsequent lens group GR comprising at least one lens group. In the variable magnification optical system ZL, upon zooming from a wide-angle end state to a telephoto end state, a distance between the first lens group G1 and the second lens group G2 is varied, a distance between the second lens group G2 and the third lens group G3 is varied, a distance between the third lens group G3 and the fourth lens group G4 is varied, and a distance between the fourth lens group G4 and the subsequent lens group GR is varied, and also when the subsequent lens group GR comprises a plurality of lens groups, each distance between the plurality of lens groups is varied. As a result, a good aberration correction can be made upon zooming.

The variable magnification optical system ZL is constructed such that, upon zooming from the wide-angle end state to the telephoto end state, the distance between the first lens group G1 and the second lens group G2 is increased, the distance between the second lens group G2 and the third lens group G3 is decreased, the distance between the third lens group G3 and the fourth lens group G4 is increased, and the distance between the fourth lens group G4 and the fifth lens group G5 is increased, so that a predetermined variable modification ratio can be secured. Further, the variable magnification optical system ZL is constructed in such a manner that the first lens group G1 is moved to the direction of an object upon zooming from the wide-angle end state to the telephoto end state with the result that the total lens length in the wide-angle end state can be shortened and the effective aperture of the first lens group can be reduced, thereby realizing a downsized variable magnification optical system ZL.

The variable magnification optical system ZL is constructed so that the third lens group G3 is moved along the optical axis upon focusing from an infinite distance object to a close distance object. With such construction, it is possible to suppress a change in the size of an image during focusing, and it is also possible to suppress satisfactorily the variation of aberrations such as spherical aberration. Hereinafter, the third lens group G3 is also referred to as "focusing lens group".

It is desirable that the variable magnification optical system ZL satisfies the following conditional expression (1):

$$0.60 < f3/f4 < 1.30 \quad (1)$$

where f3 denotes a focal length of the third lens group G3, and f4 denotes a focal length of the fourth lens group G4.

The conditional expression (1) defines a range of the focal length of the third lens group G3 relative to the focal length of the fourth lens group G4, which range is proper to the suppression of variation in aberration upon focusing from an infinite distance object to a close distance object and is also proper to a good correction of various aberrations. When the value of f3/f4 is equal to or exceeds the upper limit value of the conditional expression (1), the fourth lens group G4 becomes larger in the refractive power, and as a result, it is difficult to make a correction of various aberrations including spherical aberration. Also, the third lens group G3 becomes smaller in the refractive power, and upon focusing from an infinite distance object to a close distance object, the third lens group G3 moves in a larger amount, which results in an increased size of the total length of the lenses. Note that the advantageous effect of the present application can be further ensured by setting the upper limit value of the conditional expression (1) to 1.10. On the other hand, when the value of f3/f4 is equal to or falls below the lower limit value of the conditional expression (1), the third lens group G3 becomes larger in the refractive power, and the variation in aberration upon focusing from the infinite distance object to the close distance object becomes larger. Note that the advantageous effect of the present application can be further ensured by setting the lower limit value of the conditional expression (1) to 0.80.

In the variable magnification optical system ZL, it is desirable that the third lens group G3 as the focusing lens group is composed only of a single positive lens or a single cemented lens having positive refractive power. With such configuration, it is possible to make the focusing lens group lighter and realize high speed auto focusing (AF) and good quietness upon auto focusing (AF) without increasing the size of the barrel.

In the variable magnification optical system ZL, it is desirable that the third lens group G3 as the focusing lens group has an aspherical surface as the most object side surface. In this case, more desirably, the aspherical surface is formed into such a shape that the positive refractive power is weakened with increasing distance from the optical axis. With such configuration, it is possible to achieve both making the weight of the focusing lens group lighter and suppressing the variation in aberration upon focusing from the infinite distance object to the close distance object, thereby realizing high speed auto focusing and good quietness upon auto focusing without increasing the size the barrel.

It is desirable that the variable magnification optical system ZL satisfies the following conditional expression (2):

$$0.11 < (-f2)/f1 < 0.19 \quad (2)$$

where f2 denotes a focal length of the second lens group G2, and f1 denotes a focal length of the first lens group G1.

The conditional expression (2) defines a range of the focal length of the second lens group G2 relative to the focal length of the first lens group G1, which range is proper to ensure a sufficient variable magnification ratio and realize good optical properties. When the value of (−f2)/f1 is equal to or exceeds the upper limit value of the conditional expression (2), that is not preferable because the first lens group G1 becomes stronger in the refractive power and the spherical aberration at a telephoto end is remarkably deteriorated. Also, the lateral chromatic aberration at a wide-angle end is significantly deteriorated. Note that the advantageous effect of the present application can be further ensured by setting the upper limit value of the conditional expression (2) to 0.16. On the other hand, when the value (−f2)/f1 is equal to or falls below the lower limit value of the conditional expression (2), the second lens group G2 becomes stronger in the refractive power, so that it is difficult to make a correction of off-axis aberration at the wide-angle end, in particular a correction of curvature of field and astigmatism. Note that the advantageous effect of the present application can be further ensured by setting the lower limit value of the conditional expression (2) to 0.14.

It is also desirable that the variable magnification optical system ZL satisfies the following conditional expression (3):

$$3.00 < f1/fw < 6.00 \tag{3}$$

where f1 denotes a focal length of the first lens group G1, and fw denotes a focal length of the whole system in the wide-angle end state.

The conditional expression (3) defines a proper range of the focal length of the first lens group G1 relative to the focal length of the variable magnification optical system ZL in the wide-angle end state. By satisfying conditional expression (3), the optical system can achieve both downsizing of the total lens length and good correcting of the curvature of field, distortion and spherical aberration. When the value of f1/fw is equal to or falls below the lower limit of the conditional expression (3), the first lens group G1 becomes larger in the refractive power, and as a result, it is difficult to make a correction of various aberrations including spherical aberration. Note that the advantageous effect of the present application can be further ensured by setting the lower limit value of the conditional expression (3) to 4.00. On the other hand, when the value of f1/fw is equal to or exceeds the upper limit value of the conditional expression (3), the first lens group G1 becomes smaller in the refractive power, and as a result, it is difficult to downsize the total lens length. Note that the advantageous effect of the present application can be further ensured by setting the upper limit value of the conditional expression (3) to 5.00.

It is also desirable that the variable magnification optical system ZL has a lens group for correcting the displacement of the imaging position caused by a camera shake or the like in such a way that at least a part of the subsequent lens group GR is moved so as to have a component in the direction perpendicular to the optical axis. With this configuration, it is possible to effectively correct the displacement of the imaging position due to a camera shake or the like.

(Second Embodiment)

The variable magnification optical system according to the second Embodiment of the present application comprises, in order from an object side along the optical axis, a first lens group having positive refractive power; a second lens group having negative refractive power; a third lens group having positive refractive power; a fourth lens group having negative refractive power; and a fifth lens group having positive refractive power, and the optical system has such a construction that upon zooming from a wide-angle end state to a telephoto end state, the first lens group is moved to the object side, a distance between the first lens group and the second lens group is increased, a distance between the second lens group and the third lens group is decreased, and a distance between the third lens group and the fourth lens group is varied, a distance between fourth lens group and the fifth lens group is varied, and upon focusing from an infinite distance object point to a close distance object point, the third lens group is moved.

The variable magnification optical system of the present application has five lens groups and, upon zooming from the wide-angle end state to the telephoto end state, can make good correction of aberration upon zooming in such a way that each distance between the lens groups is varied. Also, it is possible to secure an approximately 4 times or more variable magnification ratio in such a way that, upon zooming from the wide-angle end state to the telephoto end state, the distance between the first lens group and the second lens group is increased and the distance between the second lens group and the third lens group is decreased. Furthermore, it is also possible to shorten the total lens length at the wide angle end state and reduce the effective aperture of the first lens group in such a way that, upon zooming from the wide-angle end state to the telephoto end state, the first lens group is moved to the object side, with the result that the variable magnification optical system can be downsized.

When the focal length of the third lens group is represented by f3 and the focal length of the whole system in the telephoto end state is represented by ft, the variable magnification optical system of the present application is constructed so as to satisfy the following conditional expression (4):

$$0.23 < f3/ft < 0.35 \tag{4}$$

The conditional expression (4) defines an appropriate range of the focal length of the third lens group relative to the focal length of the variable magnification optical system in the telephoto end state to control the size of the variable magnification optical system and suppress the variation in aberration upon focusing from an infinite distance object point to a close distance object point.

When the value of f3/ft is equal to or exceeds the upper limit value of the conditional expression (4), the third lens group becomes smaller in the refractive power and the movement amount of the third lens group moved for zooming from the wide-angle end state to the telephoto end state and focusing from an infinite distance object point to a close distance object point is increased, and as a result, the optical system become larger undesirably. Also, when the value of f3/ft is equal to or exceeds the upper limit value of the conditional expression (4), since the movement amount of the third lens group moved for focusing from the infinite distance object to the close distance object point is increased, the variation in various aberrations including the spherical aberration is increased upon focusing from the infinite distance object point to the close distance object point in the telephoto end state. Note that the advantageous effect of the present application can be further ensured by setting the upper limit value of the conditional expression (4) to 0.32. Also, note that the advantageous effect of the present application can be even further ensured by setting the upper limit value of the conditional expression (4) to 0.31.

On the other hand, when the value of f3/ft is equal to or falls below the lower limit value of the conditional expression (4), the third lens group G3 becomes larger in the refractive power, and the variation in spherical aberration upon focusing from an infinite distance object to a close distance object in the telephoto end state is increased. Note that the advantageous effect of the present application can be further ensured by setting the lower limit value of the conditional expression (4) to 0.26. Also, note that the advantageous effect of the present application can be even further ensured by setting the lower limit value of the conditional expression (4) to 0.27.

When the focal length of the second lens group is represented by f2 and the focal length of the third lens group is represented by f3, the variable magnification optical system of the present application is constructed to satisfy the following conditional expression (5):

$$2.60 < (-f3)/f2 < 3.60 \tag{5}$$

The conditional expression (5) defines a proper range of the focal length of the third lens group relative to the focal length of the second lens group, which range is suitable for the suppression of variation in aberration upon focusing from the infinite distance object point to the close distance object point and for a good correction of various aberrations.

When the value of (−f3)/f2 is equal to or exceeds the upper limit value of the conditional expression (5), the second lens group becomes larger in the refractive power, and as a result, it is difficult to make a correction of various aberrations including spherical aberration. Also, the third lens group is moved in a larger amount, which leads to upsizing of the total lens length. Note that the advantageous effect of the present application can be further ensured by setting the upper limit value of the conditional expression (5) to 3.40. Also, note that the advantageous effect of the present application can be even further ensured by setting the upper limit value of the conditional expression (5) to 3.20.

On the other hand, when the value of (−f3)/f2 is equal to or falls below the lower limit value of the conditional expression (5), the third lens group becomes larger in the refractive power, and the variation in aberration upon focusing from the infinite distance object point to the close distance object point becomes larger. Note that the advantageous effect of the present application can be further ensured by setting the lower limit value of the conditional expression (5) to 2.80. Also, note that the advantageous effect of the present application can be even further ensured by setting the lower limit value of the conditional expression (5) to 2.90.

With the above described configuration, a downsized and light weight focusing lens group is provided, and it is possible for the present application to realize high speed and good quietness autofocusing without increasing the size of the barrel. Additionally, with the above described configuration, it is possible to realize a variable magnification optical system which successfully suppresses the variation in aberration upon zooming from the wide-angle end state to the telephoto end state and the variation in aberration upon focusing from the infinite distance object point to the close distance object point.

In the variable magnification optical system according to the present application, it is desirable that, upon zooming from the wide-angle end state to the telephoto end state, the fourth lens group and the fifth lens group are moved toward the object side, the distance between the third lens group and the fourth lens group is increased, and the distance between the fourth lens group and the fifth lens group is decreased.

With the above described configuration, a correction of aberration upon zooming from the wide-angle end state to the telephoto end state, suppression of the variation in aberration upon focusing from the infinite distance object point to the close distance object point and an approximately 4 times or more variable magnification ratio can be further ensured.

In the variable magnification optical system according to the present application, it is desirable that the third lens group comprises a cemented lens composed of, in order from the object side along the optical axis, a double convex positive lens and a negative meniscus lens having a concave surface facing the object side.

With the above described configuration, the focusing lens group is made much lighter. Higher-speed and better quietness autofocusing can be realized without increasing the size of the barrel. Additionally, since the third lens group is a cemented lens, the variation in chromatic aberration upon focusing from the infinite distance object point to the close distance object point can be corrected successfully.

When the refractive index of the negative meniscus lens is represented by nN and the refractive index of the double convex positive lens is represented by nP, the variable magnification optical system of the present application desirably satisfies the following conditional expression (6):

$$0.15 < nN - nP < 0.45 \quad (6)$$

The conditional expression (6) defines a difference in the refractive index between the double convex positive lens and the negative meniscus lens, of the cemented lens forming the third lens group, which difference is proper to suppress the variation in aberration upon focusing from the infinite distance object point to the close distance object point.

When the value of nN−nP is equal to or exceeds the upper limit value of the conditional expression (6), the correction of spherical aberration by the cemented surface becomes excessively large. As a result, the variation in spherical aberration upon focusing from the infinite distance object point to the close distance object point becomes large, so that it becomes difficult to correct the aberration. Note that the advantageous effect of the present application can be further ensured by setting the upper limit value of the conditional expression (6) to 0.38. Also, note that the advantageous effect of the present application can be even further ensured by setting the upper limit value of the conditional expression (6) to 0.35.

On the other hand, when the value of nN−nP is equal to or falls below the lower limit value of the conditional expression (6), the correction of spherical aberration by the cemented surface of the cemented lens becomes insufficient. As a result, the variation in spherical aberration upon focusing from the infinite distance object point to the close distance object point becomes large, so that it becomes difficult to correct the aberration. Note that the advantageous effect of the present application can be further ensured by setting the lower limit value of the conditional expression (6) to 0.22. Also, note that the advantageous effect of the present application can be even further ensured by setting the lower limit value of the conditional expression (6) to 0.23.

When the Abbe number of the double convex positive lens is represented by νP and the Abbe number of the negative meniscus lens is represented by νN, the variable magnification optical system of the present application desirably satisfies the following conditional expression (7):

$$25.00 < \nu P - \nu N < 45.00 \quad (7)$$

The conditional expression (7) defines a difference in the Abbe number between the double convex positive lens and the negative meniscus lens, of the cemented lens forming the third lens group, to realize a good correction of chromatic aberration by the third lens group.

When the value of νP−νN is equal to or exceeds the upper limit value of the conditional expression (7), the correction of chromatic aberration by the third lens group becomes excessively large. As a result, the variation in chromatic aberration upon focusing from the infinite distance object point to the close distance object point becomes excessively large. Note that the advantageous effect of the present application can be further ensured by setting the upper limit value of the conditional expression (7) to 40.00. Also, note that the advantageous effect of the present application can be even further ensured by setting the upper limit value of the conditional expression (7) to 36.00.

On the other hand, when the value of νP−νN is equal to or falls below the lower limit value of the conditional expression (7), the correction of chromatic aberration by the third lens group becomes insufficient. As a result, the variation in chromatic aberration upon focusing from the infinite distance object point to the close distance object point becomes excessively large. Note that the advantageous effect of the present application can be further ensured by setting the lower limit value of the conditional expression (7) to 30.00. Also, note that the advantageous effect of the present application can be even further ensured by setting the lower limit value of the conditional expression (7) to 32.00.

When the focal length of the first lens group is represented by f1 and the focal length of the whole system in the wide-angle end state is represented by fw, the variable magnification optical system of the present application desirably satisfies the following conditional expression (8):

$$3.50<f1/fw<5.30 \tag{8}$$

The conditional expression (8) defines a proper focal length of the first lens group relative to the focal length of the whole system in the wide-angle end state. By satisfying conditional expression (8), the optical system can achieve both downsizing of the total lens length and good correcting of the curvature of field, distortion and spherical aberration.

When the value of f1/fw is equal to or falls below the lower limit of the conditional expression (8), the first lens group becomes larger in the refractive power, and as a result, it is difficult to make a correction of various aberrations including spherical aberration. Note that the advantageous effect of the present application can be further ensured by setting the lower limit value of the conditional expression (8) to 3.90. Also, note that the advantageous effect of the present application can be even further ensured by setting the lower limit value of the conditional expression (8) to 4.20.

On the other hand, when the value of f1/fw is equal to or exceeds the upper limit value of the conditional expression (8), the first lens group becomes smaller in the refractive power, and as a result, it is difficult to downsize the total lens length. Note that the advantageous effect of the present application can be further ensured by setting the upper limit value of the conditional expression (8) to 4.90. Also, note that the advantageous effect of the present application can be even further ensured by setting the upper limit value of the conditional expression (8) to 4.70.

The variable magnification optical system according to the present application can be constructed so that the fourth lens group and the fifth lens group are substantially a focal in the wide-angle end state and can be also constructed to have such a structure that the distance between the lens groups is varied so as to decrease upon zooming from the wide-angle end to the telephoto end, making a much better correction of the various aberrations in the range from the wide-angle end to the telephoto end. When the focal length of the fourth lens group is represented by f4 and the focal length of the fifth lens group is represented by f5, the variable magnification optical system of the present application desirably satisfies the following conditional expression (9):

$$2.00<(-f4)/f5<4.00 \tag{9}$$

The conditional expression (9) defines an appropriate ratio between the focal length of the fourth lens group and the focal length of the fifth lens group. The variable magnification optical system according to the present application can realize a good correction of the curvature of field, distortion and spherical aberration by satisfying the conditional expression (9).

When the value of (−f4)/f5 is equal to or falls below the lower limit of conditional expression (9), the refractive power of the fourth lens group becomes large relative to the refractive power of the fifth lens group, it becomes difficult to correct various aberrations such as spherical aberration. Note that the advantageous effect of the present application can be further ensured by setting the lower limit value of the conditional expression (9) to 2.50. Also, note that the advantageous effect of the present application can be even further ensured by setting the lower limit value of the conditional expression (9) to 2.70.

On the other hand, when the value of (−f4)/f5 is equal to or exceeds the upper limit value of the conditional expression (9), the refractive power of the fourth lens group becomes small relative to the refractive power of the fifth lens group, and it is difficult to correct various aberrations including the curvature of field. Note that the advantageous effect of the present application can be further ensured by setting the upper limit value of the conditional expression (9) to 3.50. Also, note that the advantageous effect of the present application can be even further ensured by setting the upper limit value of the conditional expression (9) to 3.30.

When the distance between the fourth lens group and the fifth lens group in the wide-angle end state is represented by D45w, the distance between the fourth lens group and the fifth lens group in the telephoto end state is represented by D45t, and the focal length of the whole system in the wide-angle end state is represented by fw, the variable magnification optical system of the present application desirably satisfies the following conditional expression (10):

$$0.15<(D45w-D45t)/fw<0.40 \tag{10}$$

The conditional expression (10) defines an appropriate range of difference between an air distance between the fourth lens group and the fifth lens group in the wide-angle end state and an air distance between the fourth lens group and the fifth lens group in the telephoto end state. The optical system can suppress the variation in the curvature of field upon zooming from the wide-angle end to the telephoto end to further downsize the whole lens length by satisfying the conditional expression (10).

When the value of (D45w−D45t)/fw is equal to or falls below the lower limit of conditional expression (10), the difference between the air distance between the fourth lens group and the fifth lens group in the wide-angle end state and the air distance between the fourth lens group and the fifth lens group in the telephoto end state becomes smaller, and it becomes difficult to make a good correction of the variation in the curvature of field upon zooming from the wide-angle end to the telephoto end. Note that the advantageous effect of the present application can be further ensured by setting the lower limit value of the conditional expression (10) to 0.22. Also, note that the advantageous effect of the present application can be even further ensured by setting the lower limit value of the conditional expression (10) to 0.25.

On the other hand, when the value of (D45w−D45t)/fw is equal to or exceeds the upper limit value of the conditional expression (10), the difference between the air distance between the fourth lens group and the fifth lens group in the wide-angle end state and the air distance between the fourth lens group and the fifth lens group in the telephoto end state becomes larger, and the total lens length becomes longer.

Note that the advantageous effect of the present application can be further ensured by setting the upper limit value of the conditional expression (10) to 0.33. Also, note that the advantageous effect of the present application can be even further ensured by setting the upper limit value of the conditional expression (10) to 0.32.

In the variable magnification optical system according to the present application, it is desirable that the most object side surface of the third lens group is an aspherical surface. With the configuration, it is possible to achieve both the light weight of the focusing lens group and the suppression of the variation in aberration upon focusing from the infinite distance object point to the close distance object point to realize much higher speed, much better quietness autofocusing, without increasing the size of the barrel.

Also in the variable magnification optical system according to the present application, it is desirable to make a correction of image blur by moving a part of the fourth lens group in the direction including a directional component perpendicular to the optical axis. With this configuration, it is possible to make an effective correction of the image blur, in other words, imaging position displacement caused by a camera shake or the like.

Next, a camera as an optical apparatus equipped with the variable magnification optical system ZL according to the above embodiment of the present application will be explained with referring to FIG. 16. The present camera 1 is a so-called mirrorless camera with an interchangeable lens equipped with the variable magnification optical system ZL according to the present embodiment as an imaging lens 2. In the present camera 1, light emitted from an unillustrated object (an object to be photographed) is converged by the imaging lens 2, so that an object image is formed on an imaging surface of an imaging part 3 through an unillustrated OLPF, that is, optical low pass filter. The object image then undergoes photoelectric conversion with a photoelectric conversion device in the imaging part 3 to generate an image of the object. The image is displayed on an EVF 4, that is, electronic view finder mounted on the camera 1. Accordingly, a photographer can observe the object through the EVF 4.

Moreover, when the photographer presses an unillustrated release button down, the image subjected to the photoelectric conversion with the imaging part 3 is stored in an unillustrated memory. In this manner, the photographer can take a picture of an object by the camera 1. In the present embodiment, an example of mirrorless camera is described. Even if the variable magnification optical system according to the present embodiment is installed in a single-lens reflex camera, which includes a quick return mirror in the camera body and is capable of observing an object through a finder optical system, the same effect as that of the camera 1 can be achieved.

Thus, the optical apparatus according to the present embodiment can realize a high speed auto focus and good quietness upon auto focusing by using the variable magnification optical system ZL of the above-mentioned features without the need to increase the size of the barrel. Additionally, it is possible to provide an optical apparatus which satisfactorily suppresses the variation in aberration upon zooming from a wide-angle end state to a telephoto end state and upon focusing from an infinite distance object to a close distance object.

The contents described below can be adopted so far as the optical performance is not deteriorated.

Although the variable magnification optical system having a five lens-group configuration is described in the present embodiment, the above-mentioned configuration conditions and the like can be applied to variable magnification optical systems having other lens-group configurations such as six or seven lens-group configuration. Also, a lens or a lens group may be added to the most object side of the variable magnification optical system, and alternatively, a lens or a lens group may be added to the most image side thereof. Incidentally, the lens group refers to a portion including at least one lens separated by an air space changing upon zooming.

Further, a single lens group or a plurality of lens groups or a segment lens group may be configured to move along the optical axis and be used as a focusing lens group for focusing from an infinite distance object to a close distance object. In this case, the focusing lens group can be applied to an auto focus and is suitable for being driven by a motor for auto focusing (such as an ultrasonic motor). In particular, it is preferable that, as described above, the third lens group G3 is used as the focusing lens group.

Further, a lens group or a segment lens group may be moved so as to have a component in a direction perpendicular to the optical axis or may be rotationally moved in an intra-plane direction including the optical axis (swayed) as a vibration reduction lens group for correcting an image blur caused by a camera shake. In particular, it is preferable that, as described above, at least a part of the subsequent lens group GR is used as a vibration reduction lens group.

Further, the lens surface may be formed into a spherical surface, a plane surface, or an aspherical surface. When the lens surface is a spherical surface or a plane surface, it is preferable because lens processing, assembling and adjustment become easy, and the optical performance can be prevented from being deteriorated by errors in the lens processing, assembling and adjustment. Also, it is preferable because even if the image plane is shifted, the deterioration in the optical performance is little. When the lens surface is an aspherical surface, the aspherical surface may be formed by a grinding process, a glass molding process in which a glass material is formed into an aspherical shape using a mold, or a compound type process in which a resin material on a glass surface is formed into an aspherical shape. The lens surface may be a diffractive optical surface, and the lens may be a gradient index lens (GRIN lens) or a plastic lens.

It is preferable that the aperture stop S is disposed in the vicinity of the third lens group G3, and its role may be substituted by the frame of the lens without providing a member as the aperture stop.

Moreover, each of the surfaces of the lenses may be coated with an anti-reflection coating having a high transmittance in a broad range of wavelength to reduce flare as well as ghost and attain high contrast and high optical performance.

Additionally, the variable magnification optical system ZL according to the above first Embodiment has a variable magnification ratio of approximately 5 to 15 times.

An outline of a method for manufacturing the variable magnification optical system ZL according to the first Embodiment of the present application is described with reference to FIG. 17. First, as step S100, a first to a fourth lens groups G1 to G4, and a subsequent lens group GR are prepared by disposing the lenses. As step S200, the lens groups are disposed in such a manner that, upon zooming from a wide-angle end state to a telephoto end state, the distance between the first lens group G1 and the second lens group G2 is varied, the distance between the second lens group G2 and the third lens group G3 is varied, the distance between the third lens group G3 and the fourth lens group G4 is varied, and the distance between the fourth lens group G4 and the subsequent lens group GR is varied. As step S300, the third lens group G3 is disposed so as to move along the optical axis upon focusing from an infinite distance object to a close distance object. As step S400, the lens groups G1 to G4 and GR are disposed so as to satisfy the above-mentioned conditional expression (1).

Specifically, in the first Embodiment of the present application, for example as shown in FIG. 1, in order from the object side, a cemented positive lens composed of a negative meniscus lens L11 having a convex surface facing the object side and a double convex positive lens L12, and a positive meniscus lens L13 having a convex surface facing the object side are disposed to form the first lens group G1; a negative lens L21 having a convex surface facing the object side, constructed by a negative meniscus lens whose surface on the object side is provided with an aspherical surface formed of a plastic resin, a double concave negative lens L22, a double convex positive lens L23, and a double concave negative lens L24 are disposed to form the second lens group G2; a cemented lens composed of a positive lens 31 having an object side lens surface formed into an aspherical surface and a negative meniscus lens L32 having a concave surface facing the object side is disposed to construct the third lens group G3; and a cemented positive lens composed of a negative meniscus lens L41 having a convex surface facing the object side and a double convex positive lens L42 is disposed to form the fourth lens group G4. Additionally, the fifth lens group G5 consisting of a cemented negative lens of a negative lens 51 having an object side lens surface formed into an aspherical shape cemented with a positive meniscus lens L52 having a convex surface facing the object side, and the sixth lens group consisting of a double convex positive lens L61 and a cemented positive lens of a double convex positive lens L62 cemented with a negative meniscus lens L63 having a concave surface facing the object side are disposed to form the subsequent lens group GR. The lens groups thus prepared are disposed by the above-mentioned procedure to manufacture the variable magnification optical system ZL.

An outline of a method for manufacturing the variable magnification optical system according to the second Embodiment of the present application is described with reference to FIG. 18.

The method for manufacturing a variable magnification optical system according to the present application shown in FIG. 18 is a method for manufacturing a variable magnification optical system comprising, in order from an object side along the optical axis: a first lens group having positive refractive power, a second lens group having negative refractive power, a third lens group having positive refractive power, a fourth lens group having negative refractive power, and a fifth lens group having positive refractive power, and the method comprises the following steps S100 to S300.

Step S100: Configuring the lens groups such that, upon zooming from a wide-angle end state to a telephoto end state, the first lens group is moved toward an object side, a distance between the first lens group and the second lens group is increased, a distance between the second lens group and the third lens group is decreased, a distance between the third lens group and the fourth lens group is varied, and a distance between fourth lens group and the fifth lens group is varied.

Step S200: Configuring the third lens group so as to move upon focusing from an infinite distance object point to a close distance object point.

Step S300: Constructing the variable magnification optical system so as to satisfy the following conditional expressions (4) and (5) in which the focal length of the second lens group is represented by f2, the focal length of the third lens group is represented by f3, and the focal length of the whole system in the telephoto end state is represented by ft:

$$0.23 < f3/ft < 0.35 \quad (4)$$

$$2.60 < (-f3)/f2 < 3.60 \quad (5)$$

According to the above manufacturing method, the focusing lens group is downsized and made light, and thus, it is possible to provide a variable magnification optical system which enables the realization of high speed and good quietness autofocusing without increasing the size of the barrel, and good suppression of the variation in aberration upon zooming from the wide-angle end state to the telephoto end state and good suppression of the variation in aberration upon focusing from the infinite distance object point to the close distance object point, and further the realization of good optical performance.

EXAMPLE

Hereinafter, examples of the present application will be described with reference to the accompanying drawings. A first Example and a second Example correspond to the above first Embodiment, and a third Example, a fourth Example and a fifth Example correspond to the above second Embodiment. FIGS. 1 and 4 are sectional views, respectively, showing the configuration and refractive power distribution of the variable magnification optical systems ZL according to the first and the second Examples, that is, variable magnification optical systems ZL1 and ZL2. Below the sectional views of the variable magnification optical systems ZL1 and ZL2 are shown directions of movement of the lens groups G1 to G4 and the lens group GR consisting of the lens groups G5 and G6 which are moved along the optical axis upon zooming from a wide-angle end state W to a telephoto end state T by arrows.

In the Examples, an aspherical surface is represented by the following expression (a) where a height in the direction perpendicular to the optical axis is represented by y; a sag amount, which is a distance along the optical axis from a tangent surface at the vertex of the aspherical surface to the aspherical surface at the height y, is represented by S(y); a radius of curvature of a reference sphere, that is, a paraxial radius of curvature is represented by r; a conical coefficient is represented by K; and an aspherical surface coefficient of n-th order is represented by An:

$$S(y) = (y^2/r)/\left[1 + (1 - K \times y^2/r^2)^{1/2}\right] + A4 \times y^4 + A6 \times y^6 + A8 \times y^8 + A10 \times y^{10} \quad (a)$$

In the following Examples, "E-n" denotes "$\times 10^{-n}$".

In the Examples, the 2nd order aspherical surface coefficient A2 is 0. In the tables of the Examples, a surface number for an aspherical surface is marked with an asterisk "*" on the right side.

First Example

FIG. 1 shows a configuration of variable magnification optical system ZL1 according to the first Example. The variable magnification optical system ZL1 shown in FIG. 1 is composed of, in order from an object side, a first lens group G1 having positive refractive power, a second lens group G2 having negative refractive power, an aperture stop S, a third lens group G3 having positive refractive power, a fourth lens group G4 having positive refractive power, and a subsequent lens group GR. In this case, the subsequent lens group GR is composed of, in order from an object side, a fifth lens group G5 having negative refractive power and a sixth lens group G6 having positive refractive power.

In the variable magnification optical system ZL1, the first lens group G1 consists of, in order from the object side, a cemented positive lens constructed by a negative meniscus lens L11 having a convex surface facing the object side cemented with a double convex positive lens L12, and a positive meniscus lens L13 having a convex surface facing the object side. The second lens group G2 consists of, in order from the object side, a negative lens L21 having a convex surface facing the object side, constructed by a negative meniscus lens whose surface on the object side is provided with an aspherical surface formed of a plastic resin, a double concave negative lens L22, a double convex positive lens L23, and a double concave negative lens L24. The third lens group G3 consists of a cemented lens constructed by, in order from the object side, a positive lens L31 having an object side lens surface formed into an aspherical shape cemented with a negative meniscus lens L32 having a concave surface facing the object side. The fourth lens group G4 consists of a cemented positive lens constructed by, in order from the object side, a negative meniscus lens L41 having a convex surface facing the object side cemented with a double convex positive lens L42. The fifth lens group G5 consists of a cemented negative lens constructed by, in order from the object side, a negative lens L51 having an object side lens surface formed into an aspherical shape cemented with a positive meniscus lens L52 having a convex surface facing the object side. The sixth lens group G6 consists of, in order from the object side, a double convex positive lens L61, and a cemented positive lens constructed by a double convex positive lens L62 cemented with a negative meniscus lens L63 having a concave surface facing the object side.

In the variable magnification optical system ZL1 according to the present first Example, each lens group of the first lens group G1 to the sixth lens group G6 is moved in the direction of an object, such that, upon zooming from a wide angle end state to a telephoto end state, an air distance between the first lens group G1 and the second lens group G2 is increased, an air distance between the second lens group G2 and the third lens group G3 is decreased, an air distance between the third lens group G3 and the fourth lens group G4 is increased, an air distance between the fourth lens group G4 and the fifth lens group G5 is increased, and an air distance between the fifth lens group G5 and the sixth lens group G6 is decreased. At that time, the aperture stop S and the fourth lens group G4 are integrally moved, that is, in the same amount of movement.

In the variable magnification optical system ZL1 according to the present first Example, the third lens group G3 as a focusing lens group is moved along the optical axis toward the image surface side to thereby conduct focusing from the infinite distance object to the close distance object.

Also in the variable magnification optical system ZL1 according to the present first Example, the fifth lens group G5 is moved so as to have a component in a direction perpendicular to the optical axis. Consequently, the displacement of imaging position which may be caused by a camera shake or the like is corrected.

Values for various specifications for the variable magnification optical system ZL1 according to the first Example are shown in Table 1 given below. For Table 1, in [Whole Specifications], f denotes a focal length of the optical system in its entirety, FNO denotes an F-number, 2ω denotes an angle of view, Ymax denotes a maximum image height, TL denotes a total length of the optical system, OP denotes an object plane, I denotes an image plane. The total length TL denotes a distance along the optical axis from the first surface of the lens surfaces to the image plane I upon focusing on infinity. W, M and T denote the wide-angle end state, intermediate focal length state and telephoto end state, respectively. In the [Lens Data], the first column m denotes an order of lens surfaces counted from the object side along the direction of travel of light, that is, a surface number. The second column r denotes a radius of curvature of lens surface, the third column d denotes a distance along the optical axis from an optical surface to a subsequent optical surface, that is, a surface-to-surface distance, the fourth column nd and the fifth column vd denote a refractive index and an Abbe number, for d-line (wavelength λ=587.6 nm). Meanwhile, the radius of curvature ∞ denotes a plane surface, and a refractive index of air 1.00000 is omitted. Surface numbers 1 to 29 in Table 1 correspond to reference numerals 1 to 29 shown in FIG. 1. In [Lens Group Focal Length], there are shown a starting surface number ST of each of the first to the sixth lens groups G1 to G6, that is, a surface number of the most object side lens surface, and a focal length f of each of the lens groups.

It is noted, here, the "mm" is generally used as the unit of length such as the focal length f, the radius of curvature r, the surface-to-surface distance d, and the unit for other lengths in connection with all the values for specifications described below. However, since similar optical performance can be obtained even by an optical system proportionally enlarged or reduced for its dimension, the unit is not necessarily limited to "mm". The description of the reference symbols and specifications in the tables below is also used in the same way for the second Example.

TABLE 1

First Example

[Whole Specifications]
Variable magnification ratio = 7.44

| | W | | M | | T |
|---|---|---|---|---|---|
| f = | 18.5 | - | 69.5 | - | 137.5 |
| FNO = | 3.37 | - | 5.07 | - | 5.87 |
| 2ω = | 78.10 | - | 22.38 | - | 11.42 |
| Ymax = | 14.25 | - | 14.25 | - | 14.25 |
| TL = | 149.23 | - | 191.09 | - | 211.23 |

[Lens Data]

| m | r | d | nd | vd |
|---|---|---|---|---|
| op | ∞ | | | |
| 1 | 198.0585 | 2.000 | 1.84666 | 23.78 |
| 2 | 71.0593 | 8.436 | 1.59319 | 67.90 |
| 3 | −281.2745 | 0.100 | | |
| 4 | 64.3516 | 4.808 | 1.81600 | 46.62 |
| 5 | 209.7899 | d5 | | |
| 6* | 91.7725 | 0.150 | 1.55389 | 38.23 |
| 7 | 87.5466 | 1.200 | 1.77250 | 49.61 |
| 8 | 13.5061 | 5.769 | | |
| 9 | −35.0552 | 1.000 | 1.81600 | 46.62 |
| 10 | 42.8672 | 0.839 | | |
| 11 | 31.6462 | 5.245 | 1.84666 | 23.78 |
| 12 | −26.4739 | 0.392 | | |

TABLE 1-continued

First Example

| | | | | |
|---|---|---|---|---|
| 13 | −23.1802 | 1.000 | 1.88300 | 40.76 |
| 14 | 937.7494 | d14 | | |
| 15 | ∞ | d15 | | Aperture Stop S |
| 16* | 28.1133 | 5.000 | 1.48749 | 70.40 |
| 17 | −30.8336 | 1.000 | 1.84666 | 23.78 |
| 18 | −46.1545 | d18 | | |
| 19 | 34.2511 | 1.000 | 2.00069 | 25.45 |
| 20 | 23.7294 | 5.400 | 1.49782 | 82.51 |
| 21 | −34.5514 | d21 | | |
| 22* | −77.1085 | 1.400 | 1.77250 | 49.61 |
| 23 | 17.7029 | 2.768 | 1.84666 | 23.78 |
| 24 | 31.2636 | d24 | | |
| 25 | 182.8242 | 3.970 | 1.57221 | 46.67 |
| 26 | −34.4813 | 0.100 | | |
| 27 | 37.3517 | 6.951 | 1.48749 | 70.40 |
| 28 | −21.1812 | 1.300 | 1.90265 | 35.70 |
| 29 | −119.3320 | BF | | |
| I | ∞ | | | |

[Lens Group Focal Length]

| | ST | f |
|---|---|---|
| G1 | 1 | 85.560 |
| G2 | 6 | −13.001 |
| G3 | 16 | 42.405 |
| G4 | 19 | 45.251 |
| G5 | 22 | −30.006 |
| G6 | 25 | 44.754 |

In the variable magnification optical system ZL1 according to the first Example, the 6th surface, 16th surface and 22nd surface are formed into an aspherical surface shape. Data for the aspherical surfaces, that is, values of a conical coefficient K and aspherical surface coefficients A4 to A10 are shown in Table 2 below. The letter "m" denotes an order of lens surfaces (surface number) counted from the object side along the direction of travel of light.

TABLE 2

[Aspherical Surface Data]

| m | K | A4 | A6 | A8 | A10 |
|---|---|---|---|---|---|
| 6 | 11.2598 | 6.09566E−06 | −4.17845E−08 | 1.53230E−10 | −3.43299E−13 |
| 16 | −0.5485 | −1.67764E−05 | 1.74753E−08 | −1.42820E−10 | 0.00000E+00 |
| 22 | 0.6725 | 8.48847E−06 | −1.22182E−08 | 1.81567E−10 | 0.00000E+00 |

In the variable magnification optical system ZL1 according to the first Example, an on-axis distance d5 between the first lens group G1 and the second lens group G2, an on-axis distance d14 between the second lens group G2 and the aperture stop S, an on-axis distance d15 between the aperture stop S and the third lens group G3, an on-axis distance d18 between the third lens group G3 and the fourth lens group G4, an on-axis distance d21 between the fourth lens group G4 and the fifth lens group G5, an on-axis distance d24 between the fifth lens group G5 and the sixth lens group G6, and a back focal length BF are each varied upon zooming as described above. The following Table 3 shows values of variable distance and back focal length BF in each focal length in the wide-angle end state W, in the intermediate focal length state M and in the telephoto end state T upon focusing on infinity and upon focusing on a close distance. Note that the back focal length BF means a distance on the optical axis from the most image side lens surface (29th surface shown in FIG. 1) to the image plane I. This explanation is the same in a second Example described later.

TABLE 3

[Variable Distance Data]

| | Infinite focusing state | | | Close distance focusing state | | |
|---|---|---|---|---|---|---|
| | W | M | T | W | M | T |
| f | 18.5 | 69.5 | 137.5 | 18.5 | 69.5 | 137.5 |
| d5 | 1.500 | 28.095 | 44.228 | 1.500 | 28.095 | 44.228 |
| d14 | 21.923 | 5.441 | 3.000 | 21.923 | 5.441 | 3.000 |
| d15 | 6.423 | 4.512 | 2.000 | 6.862 | 4.833 | 2.504 |
| d18 | 3.063 | 4.974 | 7.486 | 2.624 | 4.653 | 6.982 |
| d21 | 2.500 | 6.346 | 7.564 | 2.500 | 6.346 | 7.564 |
| d24 | 10.064 | 6.218 | 5.000 | 10.064 | 6.218 | 5.000 |
| BF | 38.02 | 69.76 | 76.21 | 38.02 | 69.76 | 76.21 |

Table 4 below shows values corresponding to respective conditional expressions for the variable magnification optical system ZL1 according to the present first Example. In Table 4, f1 denotes a focal length of the first lens group G1, f2 denotes a focal length of the second lens group G2, f3 denotes a focal length of the third lens group G3, f4 denotes a focal length of the fourth lens group G4, and fw denotes a focal length of the whole system of the variable magnification optical system ZL1 in the wide-angle end state. The description of the reference symbols is also applied to the second Example in the same way.

TABLE 4

[Values for Conditional Expressions]

(1) f3/f4 = 0.937
(2) (−f2)/f1 = 0.152
(3) f1/fw = 4.627

Thus, the variable magnification optical system ZL1 according to the first Example satisfies all the conditional expressions (1)-(3).

Figure 2A:
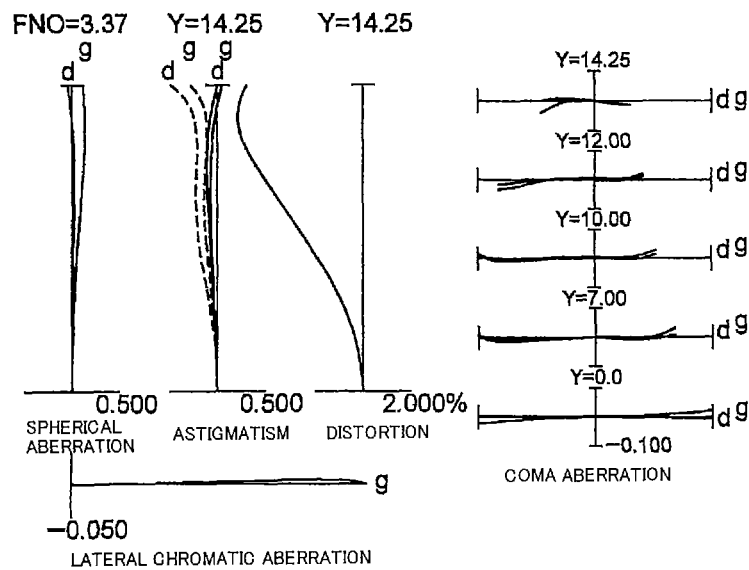
Figure 2B:
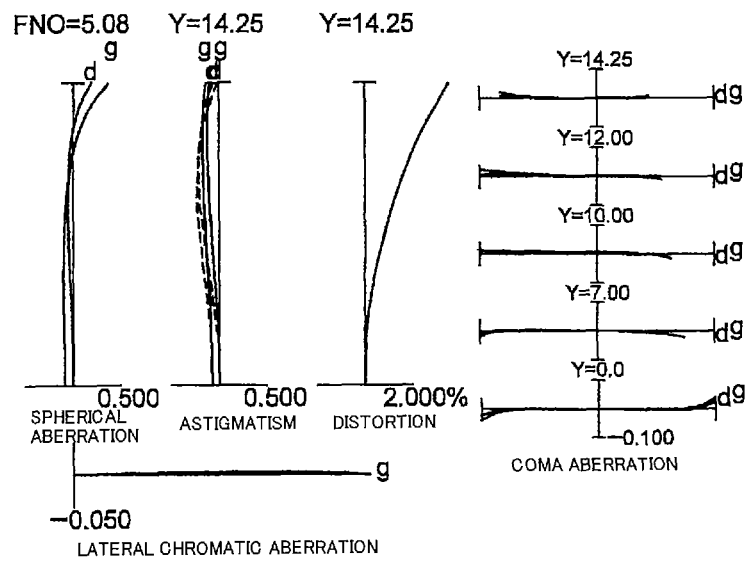
Figure 2C:
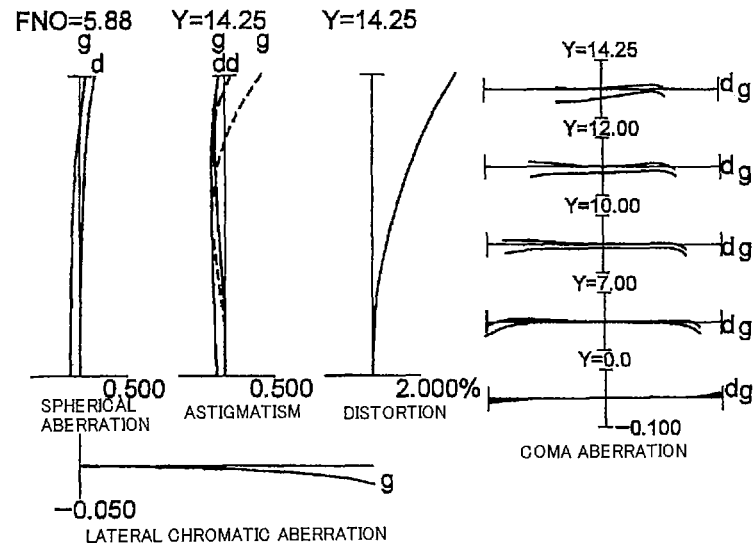
Figure 3A:
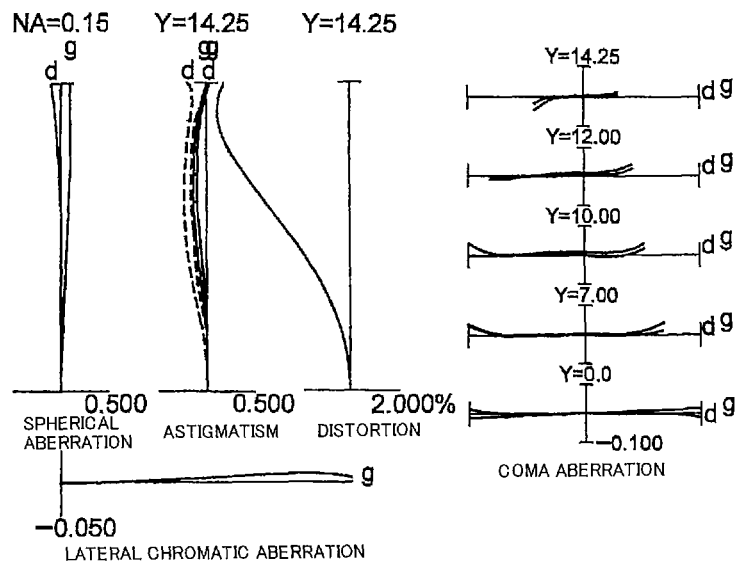
Figure 3B:
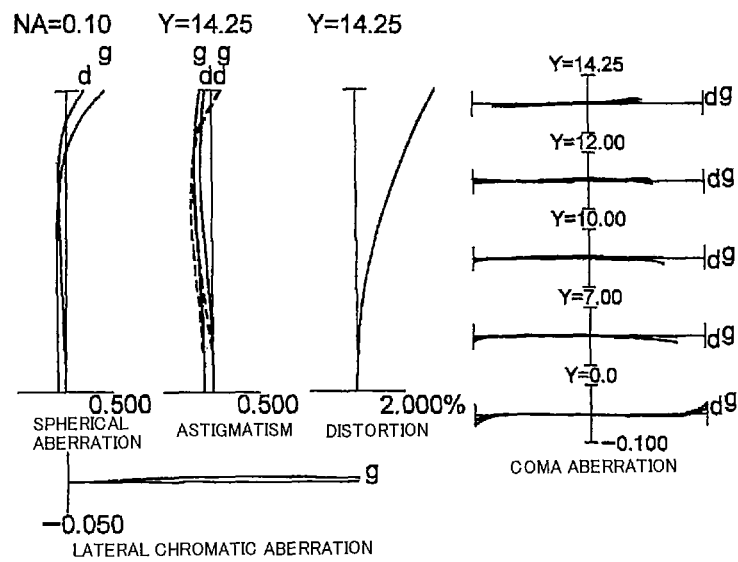
Figure 3C:
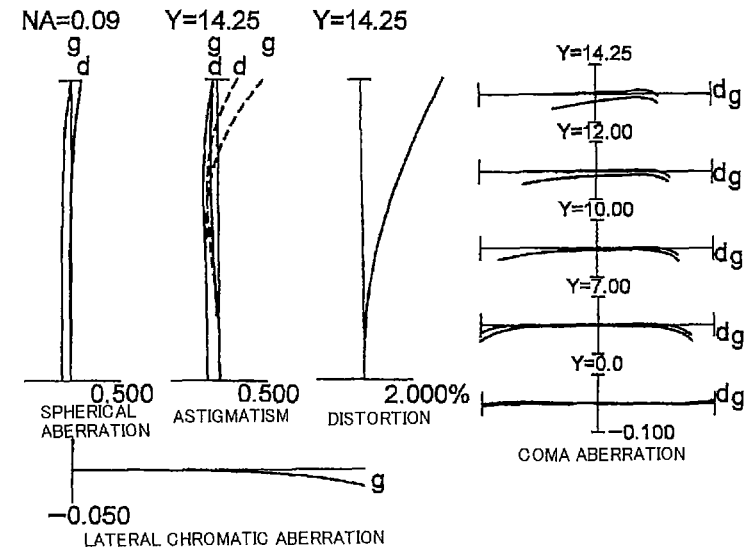

Graphs of various aberrations of the variable magnification optical system ZL1 according to the First Example upon focusing on infinity in the wide-angle end state, in the intermediate focal length state, and in the telephoto end state are shown in FIG. 2. Graphs of various aberrations of the variable magnification optical system upon focusing on the close distance, in the wide-angle end state, in the intermediate focal length state, and in the telephoto end state are shown in FIG. 3. In the aberration graphs, FNO denotes an F-number, NA denotes a numerical aperture, and Y denotes an image height. Incidentally, the spherical aberration graphs shows an F-number, corresponding to the maximum aperture, or a value of the numerical aperture, the astigmatism graphs and distortion graphs show a maximum value of image height, and the coma aberration graphs shows values of image heights. In the graphs, d and g denote a d-line ($\lambda$=587.6 nm) and a g-line ($\lambda$=435.8 nm), respectively. In the astigmatism graph, a solid line indicates a sagittal image plane, and a broken line indicates a meridional image plane. Incidentally, the same symbols as in the present Example are used also in aberration graphs in the second Example given later. As is seen from these aberration graphs, the variable magnification optical system ZL1 according to the present first Example shows superb imaging performance as a result of a good correction of various aberrations in the range from the wide-angle end state to the telephoto end state and provides superior imaging performance also upon focusing on the close distance.

Second Example

FIG. 4 shows a configuration of variable magnification optical system ZL2 according to the second Example. The variable magnification optical system ZL2 shown in FIG. 4 is composed of, in order from an object side, a first lens group G1 having positive refractive power, a second lens group G2 having negative refractive power, an aperture stop S, a third lens group G3 having positive refractive power, a fourth lens group G4 having positive refractive power, and a subsequent lens group GR. In this case, the subsequent lens group GR is composed of, in order from an object side, a fifth lens group G5 having negative refractive power and a sixth lens group G6 having positive refractive power.

In the variable magnification optical system ZL2, the first lens group G1 consists of, in order from the object side, a cemented positive lens constructed by a negative meniscus lens L11 having a convex surface facing the object side cemented with a double convex positive lens L12, and a positive meniscus lens L13 having a convex surface facing the object side. The second lens group G2 consists of, in order from the object side, a negative lens L21 having a convex surface facing the object side, constructed by a negative meniscus lens whose surface on the object side is provided with an aspherical surface formed of a plastic resin, a double concave negative lens L22, a double convex positive lens L23, and a double concave negative lens L24. The third lens group G3 consists of a positive lens L31 having an object side lens surface formed into an aspherical shape. The fourth lens group G4 consists of a cemented positive lens constructed by, in order from the object side, a negative meniscus lens L41 having a convex surface facing the object side cemented with a double convex positive lens L42. The fifth lens group G5 consists of a cemented negative lens constructed by, in order from the object side, a negative lens L51 having an object side lens surface formed into an aspherical shape cemented with a positive meniscus lens L52 having a convex surface facing the object side. The sixth lens group G6 consists of, in order from the object side, a double convex positive lens L61, and a cemented positive lens constructed by a double convex positive lens L62 cemented with a negative meniscus lens L63 having a concave surface facing the object side.

In the variable magnification optical system ZL2 according to the present second Example, each lens group of the first lens group G1 to the sixth lens group G6 is moved in the direction of an object such that, upon zooming from a wide angle end state to a telephoto end state, an air distance between the first lens group G1 and the second lens group G2 is increased, an air distance between the second lens group G2 and the third lens group G3 is decreased, an air distance between the third lens group G3 and the fourth lens group G4 is increased, an air distance between the fourth lens group G4 and the fifth lens group G5 is increased, and an air distance between the fifth lens group G5 and the sixth lens group G6 is decreased. At that time, the aperture stop S is moved integrally with the fourth lens group G4 (in the same amount of movement).

In the variable magnification optical system ZL2 according to the present second Example, the third lens group G3 as a focusing lens group is moved along the optical axis toward the image surface side to thereby conduct focusing from an infinite distance object to a close distance object.

Also in the variable magnification optical system ZL2 according to the present second Example, the fifth lens group G5 is moved so as to have a component in a direction perpendicular to the optical axis. Consequently, the displacement of imaging position which may be caused by a camera shake or the like is corrected.

Values of various specification for the variable magnification optical system ZL2 according to the second Example are shown in Table 5 given below. The surface numbers 1 to 28 in Table 5 correspond to the reference numerals 1 to 28 in FIG. 4.

TABLE 5

Second Example

[Whole Specifications]
Variable magnification ratio = 7.41

| | W | | M | | T |
|---|---|---|---|---|---|
| f = | 18.5 | - | 70.1 | - | 137.2 |
| FNO = | 3.45 | - | 5.13 | - | 5.89 |
| 2ω = | 78.06 | - | 22.18 | - | 11.50 |
| Ymax = | 14.25 | - | 14.25 | - | 14.25 |
| TL = | 150.24 | - | 192.79 | - | 211.18 |

[Lens Data]

| m | r | d | nd | νd |
|---|---|---|---|---|
| op | ∞ | | | |
| 1 | 164.7224 | 2.000 | 1.84666 | 23.78 |
| 2 | 69.2610 | 9.569 | 1.49782 | 82.51 |
| 3 | −215.6328 | 0.100 | | |
| 4 | 59.9128 | 5.133 | 1.77250 | 49.61 |
| 5 | 210.3577 | d5 | | |
| 6* | 151.4197 | 0.150 | 1.55389 | 38.23 |
| 7 | 141.4818 | 1.200 | 1.77250 | 49.61 |
| 8 | 13.4456 | 5.852 | | |
| 9 | −46.9540 | 1.000 | 1.81600 | 46.62 |
| 10 | 50.1225 | 0.500 | | |
| 11 | 27.2349 | 5.330 | 1.84666 | 23.78 |
| 12 | −29.7129 | 0.313 | | |
| 13 | −26.7614 | 1.000 | 1.88300 | 40.76 |
| 14 | 69.1420 | d14 | | |
| 15 | ∞ | d15 | | Aperture Stop S |
| 16* | 28.2763 | 4.500 | 1.49782 | 82.51 |
| 17 | −63.7625 | d17 | | |
| 18 | 41.6479 | 1.000 | 1.84666 | 23.78 |
| 19 | 25.3852 | 6.300 | 1.48749 | 70.40 |
| 20 | −26.7000 | d20 | | |
| 21* | −67.5835 | 1.400 | 1.77250 | 49.61 |
| 22 | 18.4411 | 2.600 | 1.85026 | 32.35 |
| 23 | 30.5414 | d23 | | |
| 24 | 126.3398 | 3.816 | 1.54282 | 48.67 |
| 25 | −47.7988 | 0.100 | | |
| 26 | 42.8945 | 7.746 | 1.48749 | 70.40 |
| 27 | −20.5949 | 1.300 | 1.90265 | 35.70 |
| 28 | −57.7623 | BF | | |
| I | ∞ | | | |

[Lens Group Focal Length]

| | ST | f |
|---|---|---|
| G1 | 1 | 85.126 |
| G2 | 6 | −12.427 |
| G3 | 16 | 40.000 |
| G4 | 18 | 41.836 |
| G5 | 21 | −28.132 |
| G6 | 24 | 43.839 |

In the variable magnification optical system ZL2 according to the second Example, the 6th surface, 16th surface and 21st surface are formed into an aspherical shape. Data for the aspherical surfaces, that is, values of a conical coefficient K and aspherical surface coefficients A4 to A10 are shown in Table 6 below. The letter "m" denotes an order of lens surfaces counted from the object side along the direction of progress of light, that is, a surface number.

TABLE 6

[Aspherical Surface Data]

| m | K | A4 | A6 | A8 | A10 |
|---|---|---|---|---|---|
| 6 | 3.5648 | 8.42661E−06 | −5.67193E−08 | 2.35593E−10 | −4.71958E−13 |
| 16 | −0.6804 | −2.20261E−05 | 1.26254E−08 | −2.16161E−10 | 0.00000E+00 |
| 21 | 1.4368 | 7.94766E−06 | 4.75605E−09 | 1.24853E−10 | 0.00000E+00 |

In the variable magnification optical system ZL2 according to the second Example, an on-axis distance d5 between the first lens group G1 and the second lens group G2, an on-axis distance d14 between the second lens group G2 and the aperture stop S, an on-axis distance d15 between the aperture stop S and the third lens group G3, an on-axis distance d17 between the third lens group G3 and the fourth lens group G4, an on-axis distance d20 between the fourth lens group G4 and the fifth lens group G5, an on-axis distance d23 between the fifth lens group G5 and the sixth lens group G6, and a back focal length BF are varied upon zooming as described above. Table 7 below shows values of variable distances and back focal length BF in each of the focal lengths in the wide-angle end state W, the intermediate focal length state M and the telephoto end state T upon focusing on infinity and focusing on a close distance object.

TABLE 7

[Variable Distance Data]

| | Infinite focusing state | | | Close distance object state | | |
|---|---|---|---|---|---|---|
| | W | M | T | W | M | T |
| f | 18.5 | 70.1 | 137.2 | 18.5 | 70.1 | 137.2 |
| d5 | 1.500 | 29.460 | 43.956 | 1.500 | 29.460 | 43.956 |
| d14 | 21.129 | 6.175 | 3.000 | 21.129 | 6.175 | 3.000 |
| d15 | 5.970 | 3.536 | 2.000 | 6.367 | 3.851 | 2.459 |
| d17 | 3.062 | 5.497 | 7.033 | 2.665 | 5.182 | 6.573 |
| d20 | 2.500 | 6.941 | 8.730 | 2.500 | 6.941 | 8.730 |
| d23 | 11.230 | 6.789 | 5.000 | 11.230 | 6.789 | 5.000 |
| BF | 38.02 | 67.56 | 74.63 | 38.02 | 67.56 | 74.63 |

Table 8 below shows values for conditional expressions for the variable magnification optical system ZL2 according to the present second Example.

TABLE 8

[Values for Conditional Expressions]

(1) f3/f4 = 0.956
(2) (−f2)/f1 = 0.146
(3) f1/fw = 4.602

Thus, the variable magnification optical system ZL2 according to the second Example satisfies all the conditional expressions (1)-(3).

Figure 5A:
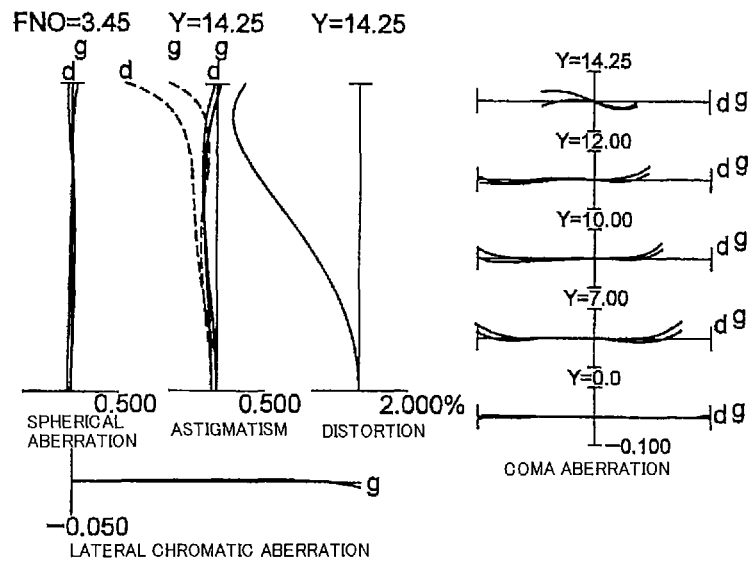
Figure 5B:
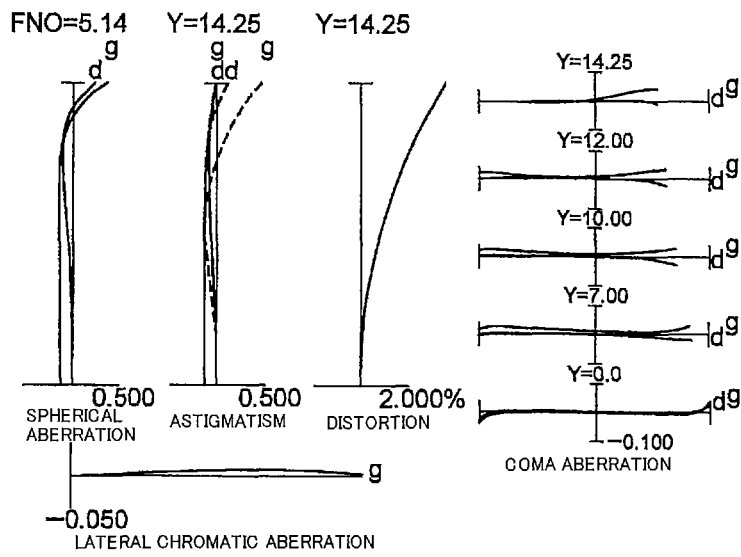
Figure 5C:
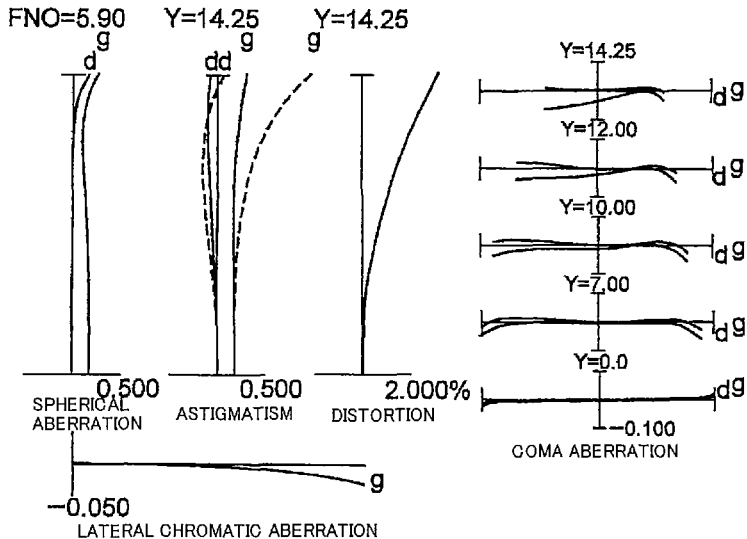
Figure 6A:
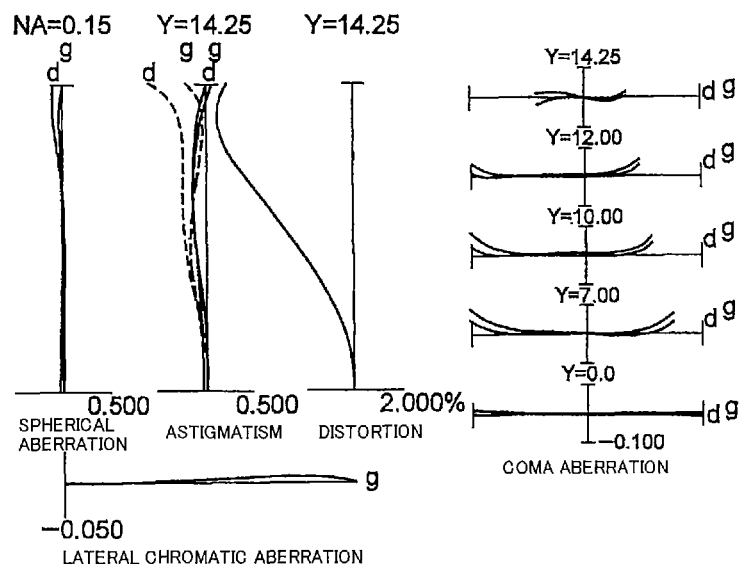
Figure 6B:
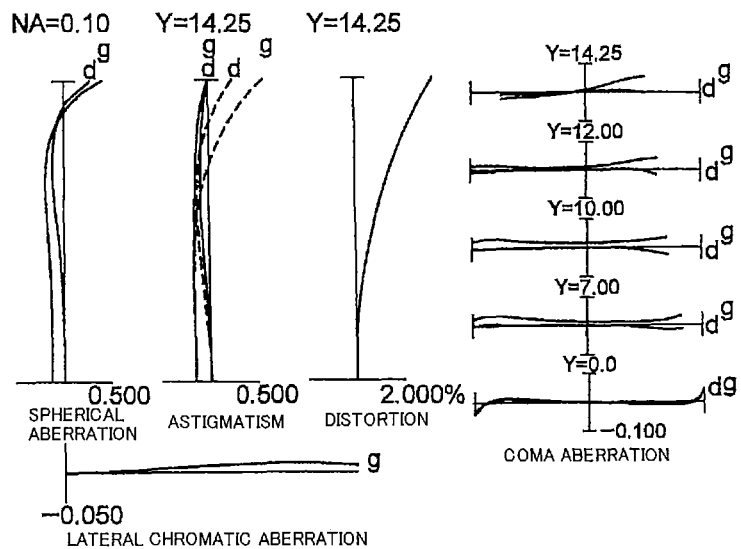
Figure 6C:
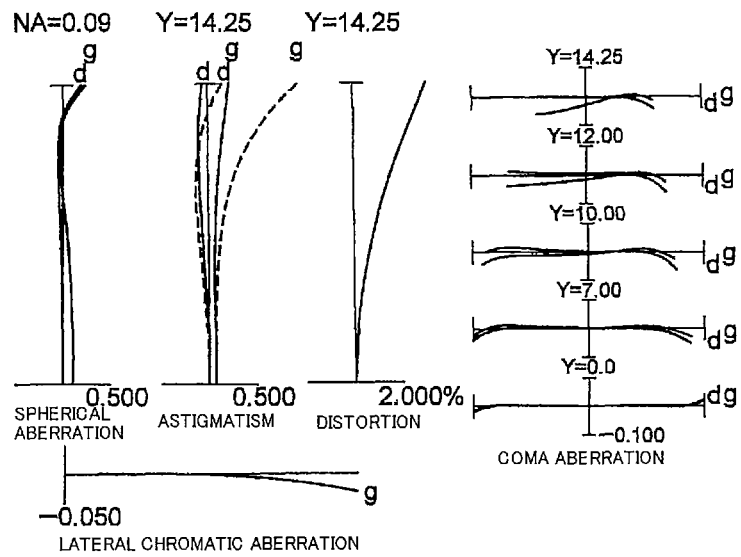

Graphs for various aberrations of the variable magnification optical system ZL2 according to the second Example upon focusing on infinity in the wide-angle end state, in the intermediate focal length state and in the telephoto end state are shown in FIG. 5. Graphs for various aberrations of the variable magnification optical system upon focusing on a close distance object in the wide-angle end state, in the intermediate focal length state and in the telephoto end state are shown in FIG. 6. As is seen from these aberration diagrams, the variable magnification optical system ZL2 according to the present second Example shows superb imaging performance as a result of a good correction of various aberrations in the range from the wide-angle end state to the telephoto end state and provides superior imaging performance also upon focusing on the close distance object.

Hereinafter, variable magnification optical systems according to a third Example to a fifth Example of the present application, corresponding to the above second Embodiment, will be described with reference to the accompanying drawings.

Third Example

Figure 7:
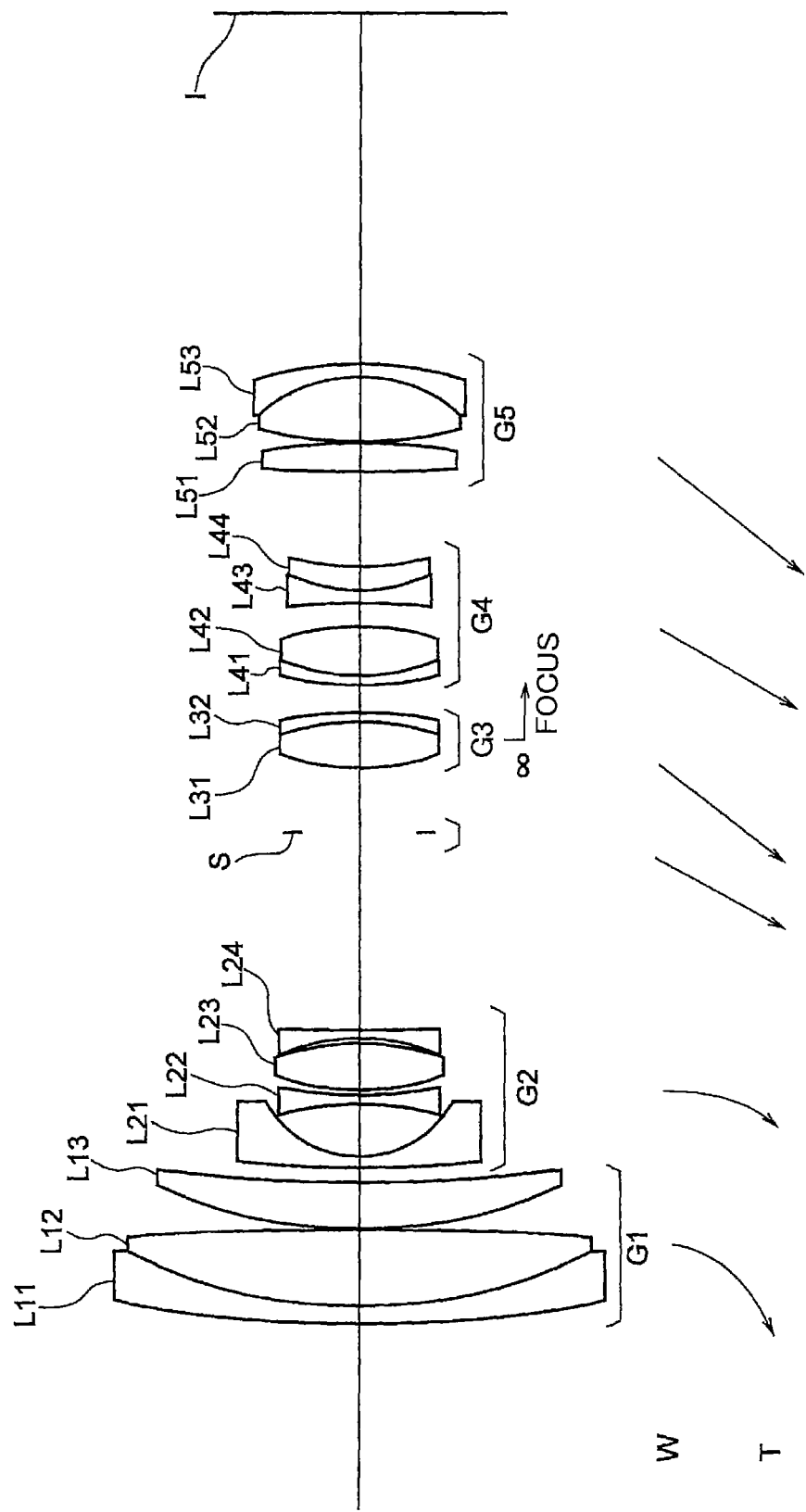
FIG. 7 is a view showing a lens arrangement of a variable magnification optical system according to a Third Example of the present application.

FIG. 7 shows a lens arrangement of a variable magnification optical system according to a third Example of the present application.

The variable magnification optical system according to the present third Example is composed of, in order from an object side along the optical axis, a first lens group G1 having positive refractive power, a second lens group G2 having negative refractive power, an aperture stop S, a third lens group G3 having positive refractive power, a fourth lens group G4 having negative refractive power, and a fifth lens group G5 having positive refractive power.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a double convex positive lens L23, and a negative meniscus lens L24 having a concave surface facing the object side. The negative meniscus lens L21 of the second lens group G2 has an object side lens surface provided with a thin layer of plastic resin formed into an aspherical shape.

The third lens group G3 consists of a cemented positive lens constructed by a double convex positive lens 31 cemented with a negative meniscus lens L32 having a concave surface facing the object side. The positive lens L31 of the third lens group G3 has an object side lens surface formed into an aspherical shape.

The fourth lens group G4 consists of, in order from the object side along the optical axis, a cemented positive lens constructed by a negative meniscus lens L41 having a convex surface facing the object side cemented with a double convex positive lens L42, and a cemented negative lens constructed by a double concave negative lens L43 cemented with a positive meniscus lens L44 having a convex surface facing the object side. The negative lens L43 of the fourth lens group G4 has an object side lens surface formed into an aspherical shape.

The fifth lens group G5 consists of, in order from the object side along the optical axis, a double convex positive lens L51, and a cemented positive lens constructed by a double convex positive lens L52 cemented with a negative meniscus lens L53 having a concave surface facing the object side.

In the variable magnification optical system according to the present Example, each lens group of the first lens group G1 to the fifth lens group G5 is moved to the side of an object such that, upon zooming from a wide angle end state to a telephoto end state, an air distance between the first lens group G1 and the second lens group G2 is increased, an air distance between the second lens group G2 and the third lens group G3 is decreased, an air distance between the third lens group G3 and the fourth lens group G4 is increased, and an air distance between the fourth lens group G4 and the fifth lens group G5 is decreased. At that time, the aperture stop S is moved together with the fourth lens group G4.

In the variable magnification optical system according to the present Example, the third lens group G3 is moved toward the image plane side to thereby conduct focusing from an infinite distance object point to a close distance object point.

In the variable magnification optical system according to the present Example, the cemented negative lens of the negative lens L43 and positive meniscus lens L44 in the fourth lens group G4 is moved in a direction including a directional component perpendicular to the optical axis. Consequently, the displacement of imaging position which may be caused by a camera shake or the like is corrected.

Values of specifications for the variable magnification optical system according to the present Example are shown in Table 9 given below.

In [Surface Data], "m" denotes an order of a lens surface counted from the object side along the optical axis, "r" denotes a radius of curvature, "d" denotes a surface distance, which is a distance between an n-th surface and an (n+1)-th surface, where n is an integer, "nd" denotes refractive index for d-line (wavelength λ=587.6 nm) and "vd" denotes an Abbe number for d-line (wavelength λ=587.6 nm). Further, "OP" denotes an object plane, and "variable" denotes a variable surface distance. Also, "stop" denotes an aperture stop S, "BF" denotes a back focal length, and "I" denotes an image plane. Meanwhile, in the column of radius of curvature "r", "∞" denotes a plane surface, and a refractive index of air nd=1.00000 is omitted. For the aspherical surface, the surface number is marked with the asterisk "*", and in the column of the radius of curvature r, a paraxial radius of curvature is shown.

In [Aspherical Surface Data], with respect to an aspherical surface shown in [Surface Data], an aspherical surface coefficient and a conical coefficient are shown in the case where the aspherical surface is represented by the following expression:

$$X = (h^2/r)/\left[1 + \left[1 - K(h/r)^2\right]^{1/2}\right] + A4h^4 + A6h^6 + A8h^8 + A10h^{10}$$

In the expression, "x" denotes a sag amount, which is a distance along the optical axis from a tangent surface at the vertex of an aspherical surface to the aspherical surface at a vertical height h from the optical axis, "K" denotes a conical coefficient, "A4", "A6", "A8", and "A10" denote respective aspherical coefficients, and "r" denotes a paraxial radius of curvature, which is a radius of curvature of a reference sphere. Additionally, "E-n", where n is an integer, denotes "×10$^{-n}$", and for example, "1.234E-05" denotes "1.234× 10$^{-5}$".

In [Various Data], "f" denotes a focal length, "FNO" denotes an F-number, "2ω" denotes an angle of view using the degree "°" as the unit, "Ymax" denotes a maximum image height, "TL" denotes a total length of the variable magnification optical system, that is, a distance along the optical axis from the first surface of lens surface to the image plane I, and "BF" denotes a back focal length.

In [Variable Distance Data], "dn" denotes a variable surface distance between an n-th surface and an (n+1)-th surface.

In [Various Data] and [Variable Distance Data], "W" denotes the wide-angle end state, "M" denotes the intermediate focal length state, and "T" denotes the telephoto end state. Also, "infinity" denotes upon focusing on an infinite distance object point, and "close distance" denotes upon focusing on a close distance object point.

In [Lens Group Data], there are shown a starting surface number ST and a focal length f of each lens group.

In [Values for Conditional Expressions] are shown values corresponding to the conditional expressions for the variable magnification optical system according to the present Example.

It is noted, here, that "mm" is generally used as the unit of a length, such as the focal length f, the radius of curvature r, the surface distance, and the like shown in Table 9. However, since similar optical performance can be obtained by an optical system proportionally enlarged or reduced for its dimension, the unit is not necessarily limited to "mm".

The reference symbols in Table 9 described above are also used in Tables for a fourth Example and a fifth Example provided later in the same way.

TABLE 9

| [Surface Data] | | | | |
|---|---|---|---|---|
| m | r | d | nd | vd |
| op | ∞ | | | |
| 1 | 168.3247 | 2.000 | 1.84666 | 23.78 |
| 2 | 63.5937 | 8.546 | 1.59319 | 67.90 |
| 3 | −343.9262 | 0.100 | | |
| 4 | 61.2261 | 5.226 | 1.81600 | 46.62 |
| 5 | 223.1789 | d5 | | |
| 6* | 222.2854 | 0.150 | 1.55389 | 38.23 |
| 7 | 153.3735 | 1.200 | 1.77250 | 49.61 |
| 8 | 12.7983 | 5.804 | | |
| 9 | −34.0102 | 1.000 | 1.81600 | 46.62 |
| 10 | 60.7684 | 0.500 | | |
| 11 | 30.1743 | 5.169 | 1.84666 | 23.78 |
| 12 | −28.1317 | 0.447 | | |
| 13 | −23.6928 | 1.000 | 1.88300 | 40.76 |
| 14 | −1288.8278 | d14 | | |
| 15(Stop) | ∞ | d15 | | |
| 16* | 25.5131 | 5.026 | 1.52144 | 67.00 |
| 17 | −31.6553 | 1.000 | 1.85026 | 32.35 |
| 18 | −55.3019 | d18 | | |
| 19 | 40.3899 | 1.000 | 2.00069 | 25.45 |
| 20 | 25.8165 | 5.400 | 1.49782 | 82.51 |
| 21 | −29.3499 | 2.500 | | |
| 22* | −73.6144 | 1.400 | 1.77250 | 49.61 |

TABLE 9-continued

| | | | | |
|---|---|---|---|---|
| 23 | 19.1936 | 2.600 | 1.84666 | 23.78 |
| 24 | 33.2373 | d24 | | |
| 25 | 178.7403 | 3.089 | 1.65311 | 47.08 |
| 26 | −69.5056 | 0.100 | | |
| 27 | 48.3544 | 7.163 | 1.48749 | 70.40 |
| 28 | −18.2461 | 1.300 | 1.90265 | 35.70 |
| 29 | −44.2532 | BF | | |
| I | ∞ | | | |

[Aspherical Surface Data]

6th Surface k = 11.2598
A4 = 1.24040E−05
A6 = −3.23075E−08
A8 = 7.25627E−11
A10 = −1.73701E−13

16th Surface k = −0.2264
A4 = −1.61628E−05
A6 = −4.70348E−09
A8 = −4.64530E−11
A10 = 0.00000E+00

22th Surface k = 0.6725
A4 = 5.63011E−06
A6 = 2.27657E−08
A8 = −2.38116E−11
A10 = 0.00000E+00

[Various Data]
Variable magnification ratio 7.46

| | W | M | T |
|---|---|---|---|
| f | 18.5 | 69.9 | 138.0 |
| FNO | 3.43 | 5.19 | 5.89 |
| 2ω | 77.98 | 22.24 | 11.42 |
| Ymax | 14.25 | 14.25 | 14.25 |
| TL | 143.38 | 186.38 | 204.92 |
| BF | 38.08 | 73.94 | 83.31 |

[Variable Distance Data]

| | Infinity focusing state | | | Close distance focusing state | | |
|---|---|---|---|---|---|---|
| | W | M | T | W | M | T |
| d5 | 1.500 | 28.127 | 41.786 | 1.500 | 28.127 | 41.786 |
| d14 | 21.548 | 6.770 | 3.000 | 21.548 | 6.770 | 3.000 |
| d15 | 7.138 | 3.763 | 2.000 | 7.619 | 4.135 | 2.572 |
| d18 | 2.962 | 6.338 | 8.101 | 2.481 | 5.966 | 7.529 |
| d24 | 10.431 | 5.722 | 5.000 | 10.431 | 5.722 | 5.000 |

[Lens Group Data]

| | ST | f |
|---|---|---|
| G1 | 1 | 80.001 |
| G2 | 6 | −12.957 |
| G3 | 16 | 40.001 |
| G4 | 19 | −152.169 |
| G5 | 25 | 47.918 |

[Values for Conditional Expressions]

(4) f3/ft = 0.290
(5) (−f3)/f2 = 3.087
(6) nN − nP = 0.329
(7) vP − vN = 34.65
(8) f1/fw = 4.319
(9) (−f4)/f5 = 3.176
(10) (D45w − D45t)/fw = 0.293

Figure 8A:
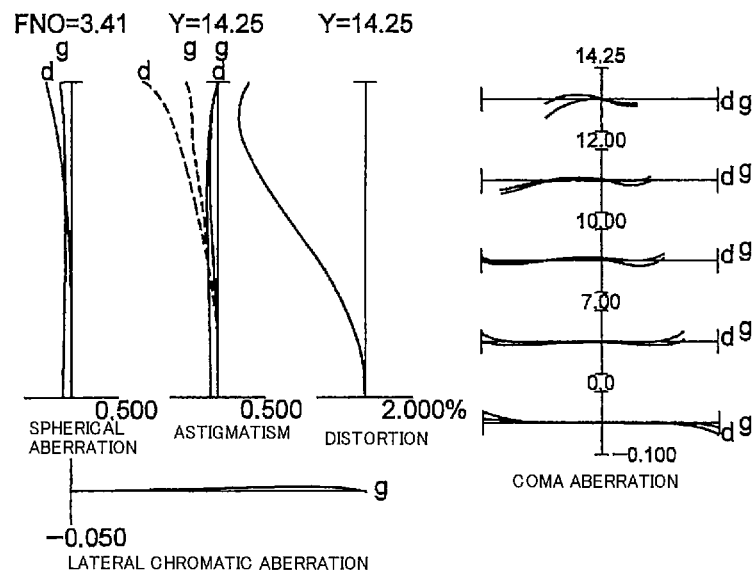
FIGS. 8A, 8B and 8C are graphs showing various aberrations of the variable magnification optical system according to the Third Example upon focusing on infinity, in a wide-angle end state, in an intermediate focal length state, and in a telephoto end state, respectively.
Figure 8B:
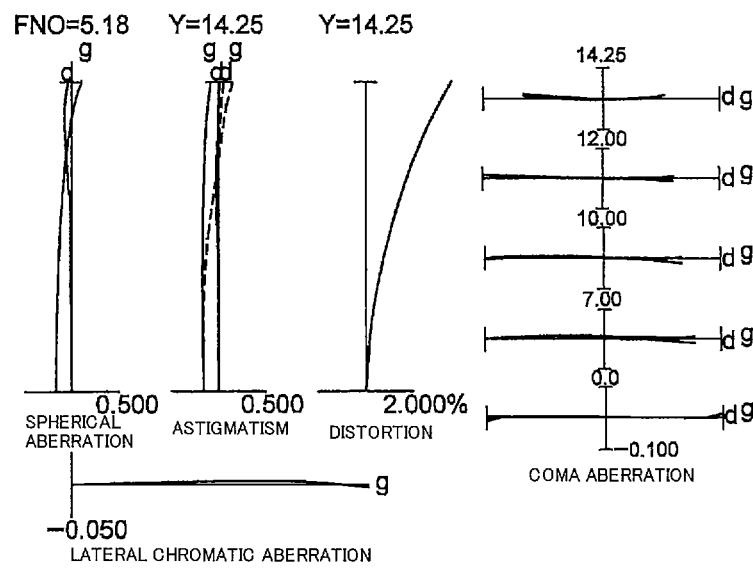
Figure 8C:
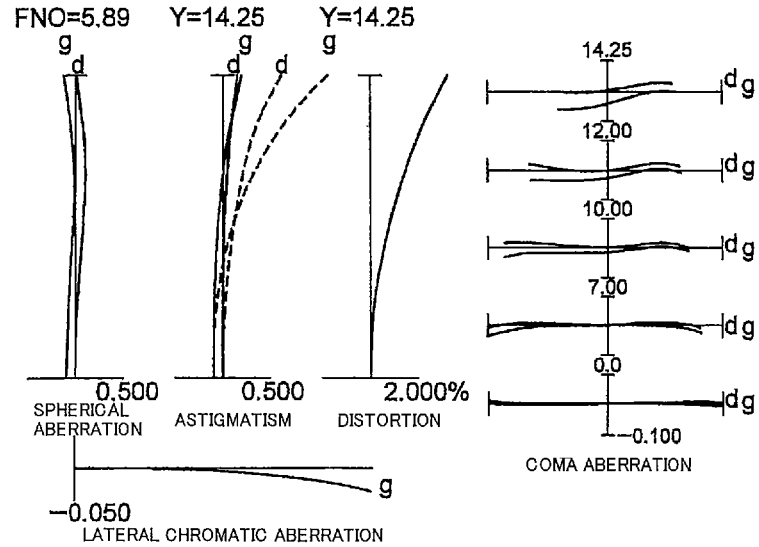

FIGS. 8A, 8B and 8C are graphs showing various aberrations of the variable magnification optical system according to the third Example of the present application upon focusing on infinity, in the wide angle end state, in the intermediate focal length state, and in the telephoto end state, respectively.

Figure 9A:
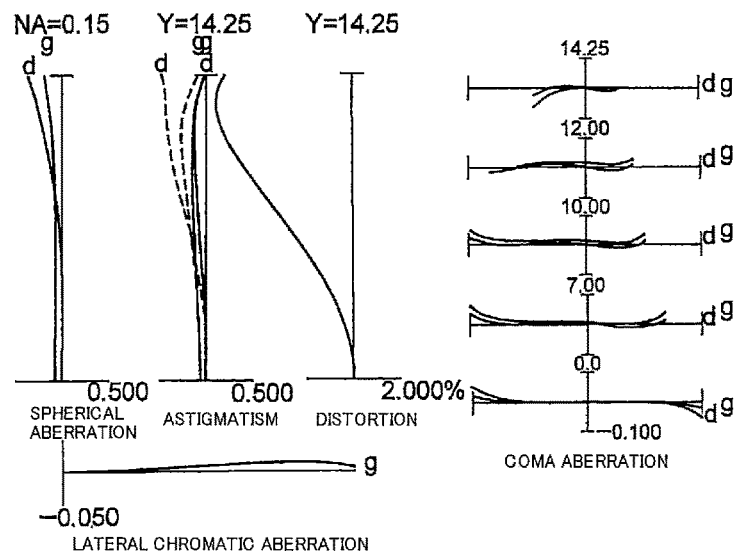
FIGS. 9A, 9B and 9C are graphs showing various aberrations of the variable magnification optical system according to the Third Example upon focusing on a close distance object, in a wide-angle end state, in an intermediate focal length state, and in a telephoto end state, respectively.
Figure 9B:
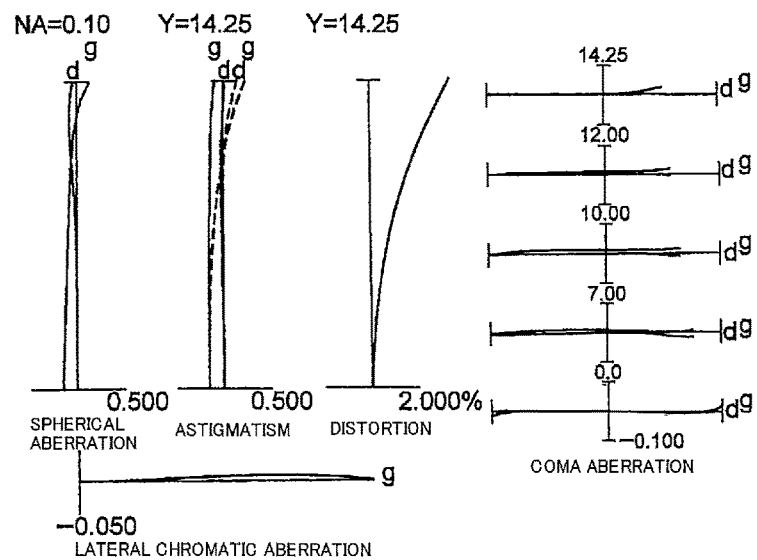
Figure 9C:
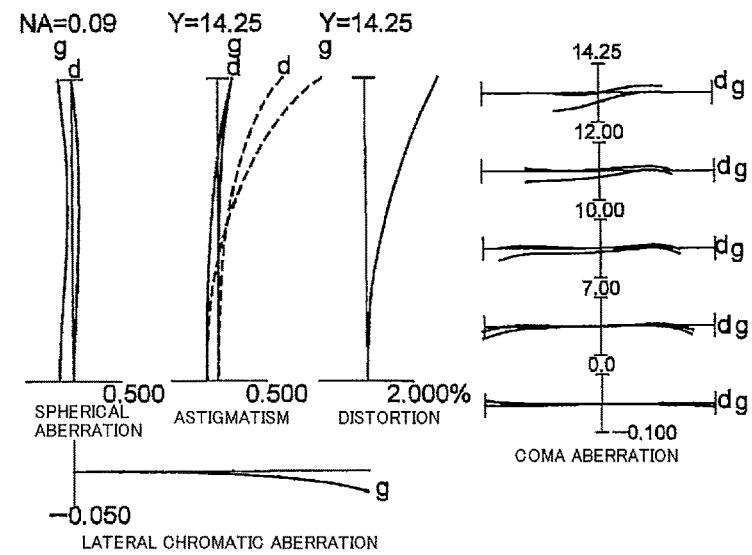

FIGS. 9A, 9B and 9C are graphs showing various aberrations of the variable magnification optical system according to the third Example of the present application upon focusing on a close distance object, in the wide angle end state, in the intermediate focal length state, and in the telephoto end state, respectively.

In the aberration graphs in FIGS. 8A, 8B, 8C, 9A, 9B, and 9C, "FNO" denotes an F-number, "NA" denotes a numerical aperture, and "Y" denotes an image height. In the graphs of spherical aberration are shown values for the F-number, corresponding to the maximum aperture, or values of the numerical aperture. In the graphs of astigmatism and distortion are shown maximum values of the image height. In the graphs of coma aberration are shown values for the image heights. In the graphs, d denotes an aberration curve at d-line (wavelength λ=587.6 nm), and g denotes an aberration curve at g-line (wavelength λ=435.8 nm). In the astigmatism graphs, a solid line indicates a sagittal image plane, and a broken line indicates a meridional image plane. Incidentally, the same symbols as in the present Example are used also in various aberration graphs in the Examples given later.

As is seen from the aberration graphs, the variable magnification optical system according to the present Example shows superb imaging performance as a result of a good correction of various aberrations in the range from the wide-angle end state to the telephoto end state and exhibits superior imaging performance also upon focusing on the close distance object.

Fourth Example

FIG. 10 shows a sectional view of a lens arrangement of a variable magnification optical system according to a fourth Example of the present application.

The variable magnification optical system according to the present fourth Example is composed of, in order from an object side along the optical axis, a first lens group G1 having positive refractive power, a second lens group G2 having negative refractive power, an aperture stop S, a third lens group G3 having positive refractive power, a fourth lens group G4 having negative refractive power, and a fifth lens group G5 having positive refractive power.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a double convex positive lens L23, and a negative meniscus lens L24 having a concave surface facing the object side.

The third lens group G3 consists of a cemented positive lens constructed by a double convex positive lens 31 cemented with a negative meniscus lens L32 having a concave surface facing the object side. The positive lens L31 of the third lens group G3 has an object side lens surface formed into an aspherical shape.

The fourth lens group G4 consists of, in order from the object side along the optical axis, a double convex positive lens L41, and a cemented negative lens constructed by a double concave negative lens L42 cemented with a positive meniscus lens L43 having a convex surface facing the object side. The negative lens L42 of the fourth lens group G4 has an object side lens surface formed into an aspherical shape.

In the variable magnification optical system according to the present fourth Example, each lens group of the first lens group G1 to the fifth lens group G5 is moved to the side of an object such that, upon zooming from a wide angle end state to a telephoto end state, an air distance between the first lens group G1 and the second lens group G2 is increased, an air distance between the second lens group G2 and the third lens group G3 is decreased, an air distance between the third lens group G3 and the fourth lens group G4 is increased, and an air distance between the fourth lens group G4 and the fifth lens group G5 is decreased. At that time, the aperture stop S is moved together with the fourth lens group G4.

In the variable magnification optical system according to the present Example, the third lens group G3 is moved toward the image plane side to thereby conduct focusing from an infinite distance object point to a close distance object point.

In the variable magnification optical system according to the present Example, the cemented negative lens of the negative lens L42 and positive meniscus lens L43 in the fourth lens group G4 is moved in a direction including a directional component perpendicular to the optical axis. Consequently, the displacement of imaging position which may be caused by a camera shake or the like is corrected.

Values of specifications for the variable magnification optical system according to the present fourth Example are shown in Table 10 given below.

TABLE 10

[Surface Date]

| m | r | d | nd | vd |
|---|---|---|---|---|
| op | ∞ | | | |
| 1 | 162.9959 | 2.000 | 1.84666 | 23.78 |
| 2 | 64.5555 | 8.419 | 1.59319 | 67.90 |
| 3 | −306.7473 | 0.100 | | |
| 4 | 62.8075 | 5.118 | 1.81600 | 46.62 |
| 5 | 218.0207 | d5 | | |
| 6* | 189.4081 | 0.150 | 1.55389 | 38.23 |
| 7 | 165.1712 | 1.200 | 1.81600 | 46.59 |
| 8 | 13.5444 | 5.538 | | |
| 9 | −34.1114 | 1.000 | 1.81600 | 46.62 |
| 10 | 58.5413 | 0.562 | | |
| 11 | 31.5714 | 5.179 | 1.84666 | 23.78 |
| 12 | −27.5725 | 0.342 | | |
| 13 | −24.7465 | 1.000 | 1.88300 | 40.76 |
| 14 | −1085.5444 | d14 | | |
| 15 (Stop) | ∞ | d15 | | |
| 16* | 27.7563 | 5.587 | 1.56973 | 66.58 |
| 17 | −20.8159 | 1.000 | 1.85026 | 32.35 |
| 18 | −46.2372 | d18 | | |
| 19 | 91.8595 | 4.279 | 1.49782 | 82.51 |
| 20 | −30.3088 | 2.646 | | |
| 21* | −84.0769 | 1.400 | 1.82199 | 43.16 |
| 22 | 22.4074 | 2.600 | 1.84666 | 23.78 |
| 23 | 36.4556 | d23 | | |
| 24 | 211.1920 | 3.515 | 1.57737 | 66.30 |
| 25 | −45.7168 | 0.100 | | |
| 26 | 49.0134 | 7.154 | 1.54032 | 53.56 |
| 27 | −18.5326 | 1.300 | 1.90265 | 35.70 |
| 28 | −67.8485 | BF | | |
| I | ∞ | | | |

TABLE 10-continued

[Aspherical Surface Data]

6th Surface

κ = 11.2598
A4 = 8.34883E−06
A6 = −3.33818E−08
A8 = 1.28598E−10
A10 = −3.80577E−13

16th Surface

κ = 0.0714
A4 = −1.41128E−05
A6 = −1.42043E−08
A8 = 4.71168E−13
A10 = 0.00000E+00

21th Surface

κ = 0.6725
A4 = 6.04257E−06
A6 = 1.76635E−08
A8 = −3.55283E−11
A10 = 0.00000E+00

[Various Date]
Variable magnification ratio 7.41

| | W | M | T |
|---|---|---|---|
| f | 18.5 | 69.6 | 137.1 |
| FNO | 3.44 | 5.33 | 5.88 |
| 2ω | 78.12 | 22.34 | 11.44 |
| Ymax | 14.25 | 14.25 | 14.25 |
| TL | 143.30 | 184.42 | 200.72 |
| BF | 38.00 | 74.24 | 80.27 |

[Variable Distance Date]

| | Infinite focusing state | | | Close distance focusing state | | |
|---|---|---|---|---|---|---|
| | W | M | T | W | M | T |
| d5 | 1.500 | 26.954 | 41.730 | 1.500 | 26.954 | 41.730 |
| d14 | 22.266 | 6.835 | 3.000 | 22.266 | 6.835 | 3.000 |
| d15 | 7.448 | 3.683 | 2.000 | 7.992 | 4.061 | 2.628 |
| d18 | 3.085 | 6.849 | 8.533 | 2.541 | 6.471 | 7.905 |
| d23 | 10.812 | 5.669 | 5.000 | 10.812 | 5.669 | 5.000 |

[Lens Group Date]

| | ST | f |
|---|---|---|
| G1 | 1 | 79.999 |
| G2 | 6 | −13.407 |
| G3 | 16 | 40.000 |
| G4 | 19 | −136.276 |
| G5 | 24 | 48.301 |

[Values for Conditional Expressions]

(4) f3/ft = 0.292
(5) (−f3)/f2 = 2.984
(6) nN − nP = 0.281
(7) vP − vN = 34.23
(8) f1/fw = 4.328
(9) (−f4)/f5 = 2.821
(10) (D45w − D45t)/fw = 0.314

Figure 11A:
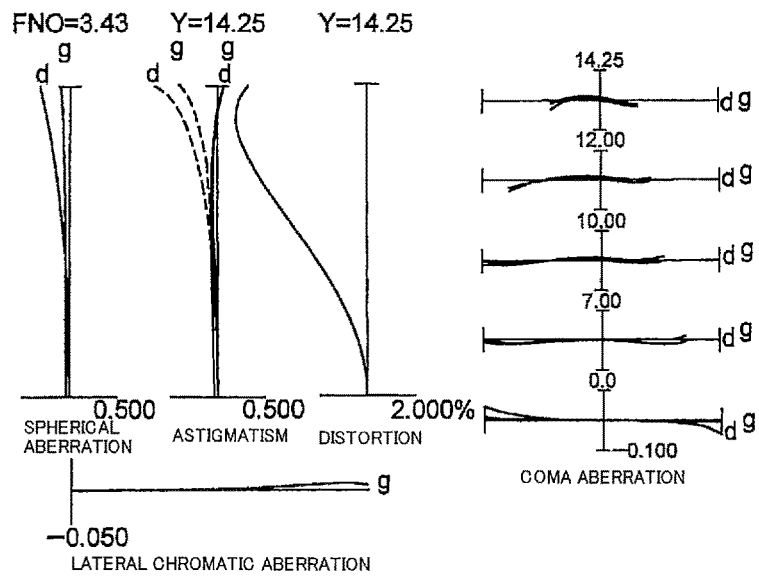
FIGS. 11A, 11B and 11C are graphs showing various aberrations of the variable magnification optical system according to the Fourth Example upon focusing on infinity, in a wide-angle end state, in an intermediate focal length state, and in a telephoto end state, respectively.
Figure 11B:
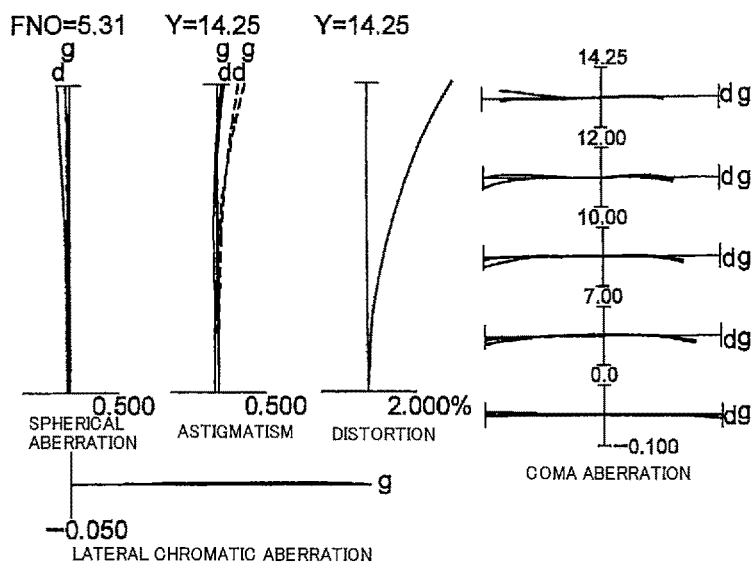
Figure 11C:
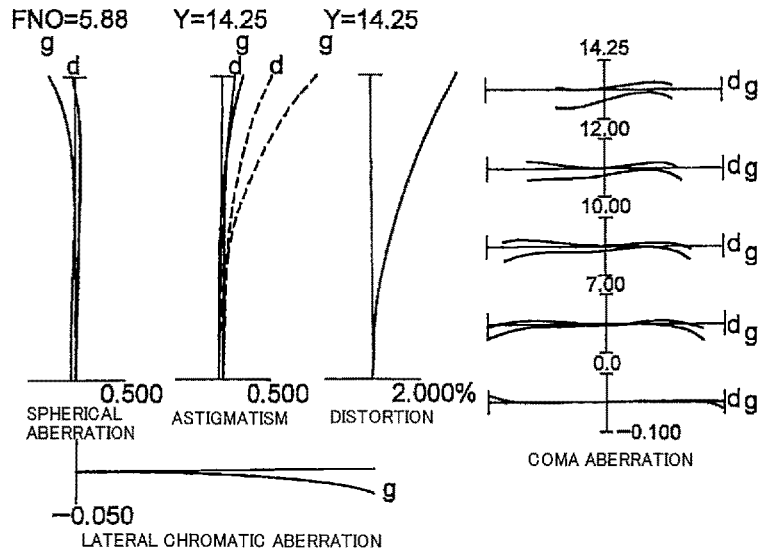

FIGS. 11A, 11B and 11C are graphs showing various aberrations of the variable magnification optical system according to the fourth Example of the present application upon focusing on infinity, in the wide angle end state, in the intermediate focal length state, and in the telephoto end state, respectively.

Figure 12A:
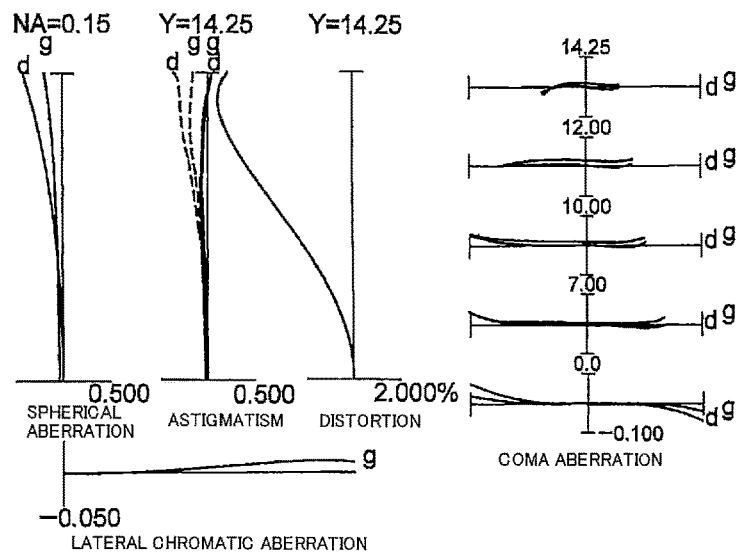
FIGS. 12A, 12B and 12C are graphs showing various aberrations of the variable magnification optical system according to the Fourth Example upon focusing on a close distance object, in a wide-angle end state, in an intermediate focal length state, and in a telephoto end state, respectively.
Figure 12B:
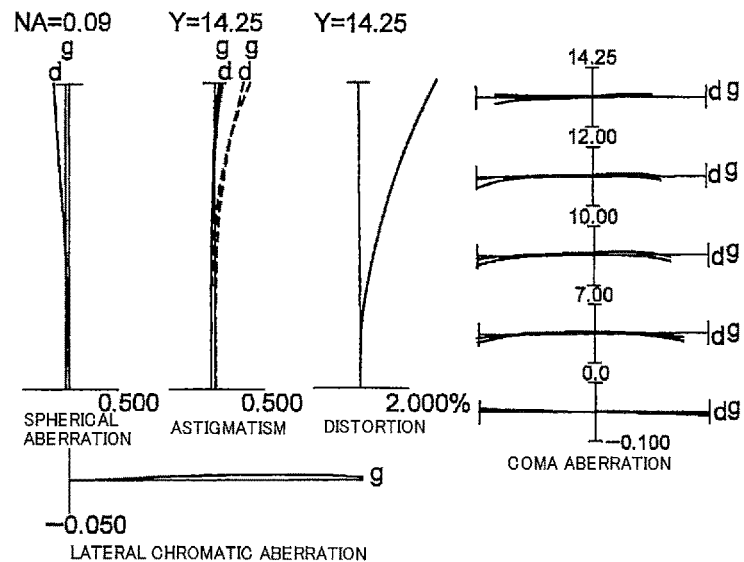
Figure 12C:
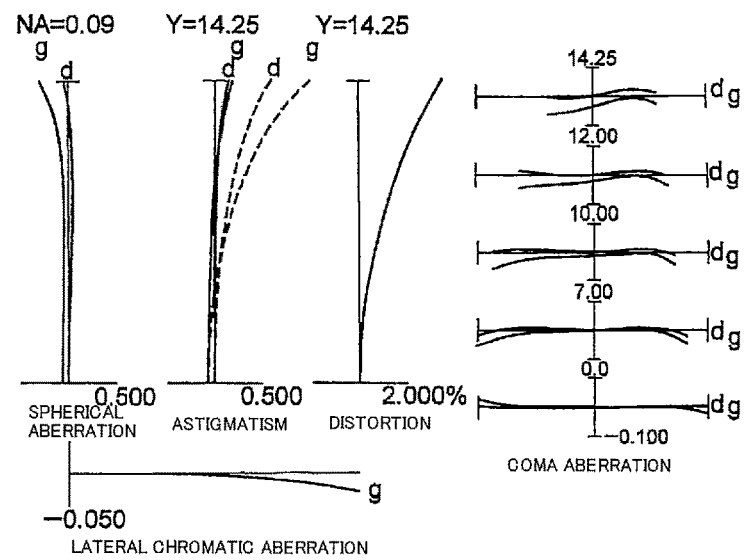

FIGS. 12A, 12B and 12C are graphs showing various aberrations of the variable magnification optical system according to the fourth Example of the present application upon focusing on a close distance object, in the wide angle end state, in the intermediate focal length state, and in the telephoto end state, respectively.

As is seen from the aberration graphs, the variable magnification optical system according to the present Example shows superb imaging performance as a result of a good correction of various aberrations in the range from the wide-angle end state to the telephoto end state and provides superior imaging performance also upon focusing on a close distance object.

Fifth Example

Figure 13:
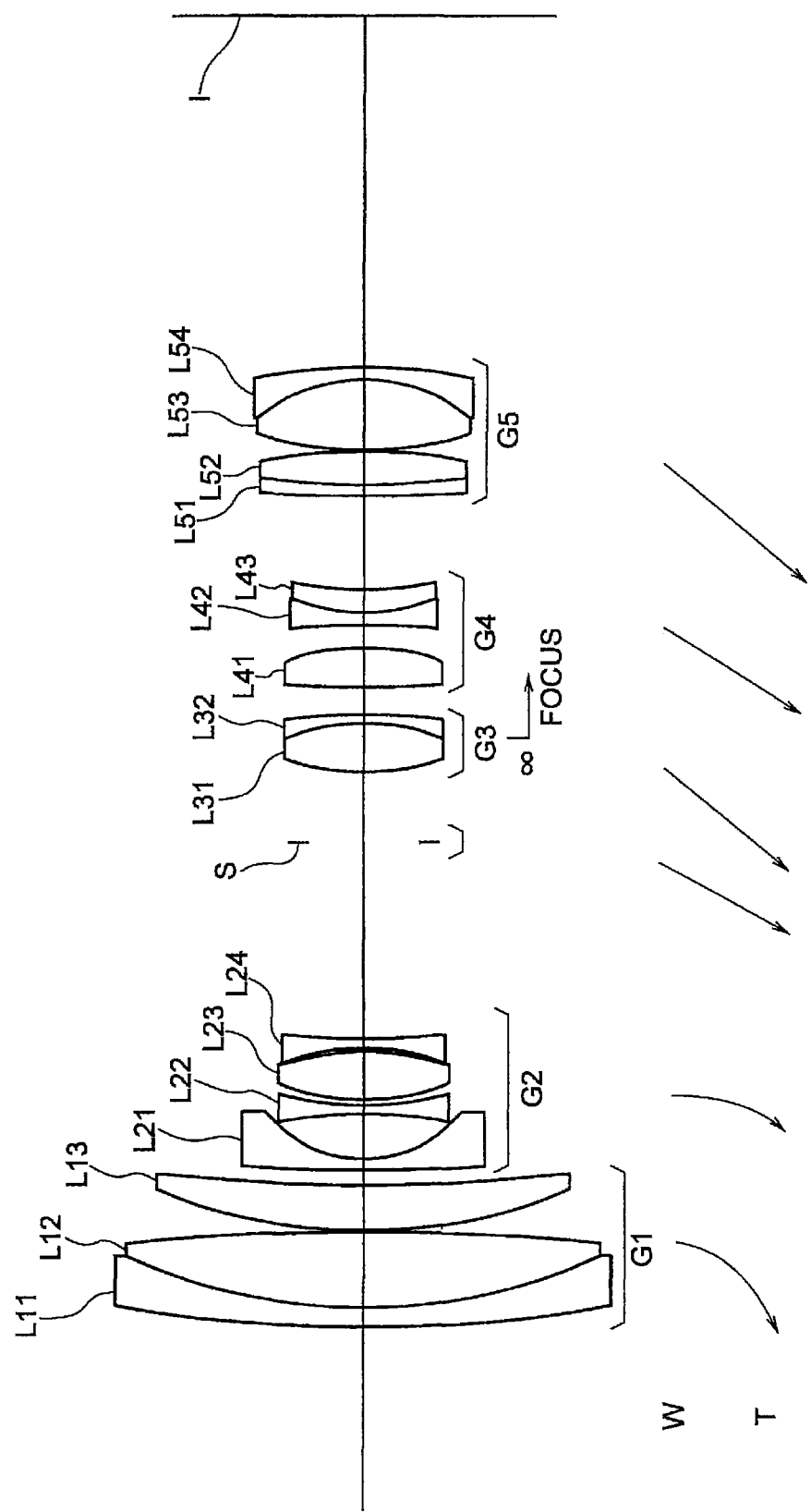
FIG. 13 is a view showing a lens arrangement of a variable magnification optical system according to a Fifth Example of the present application.

FIG. 13 shows a lens arrangement of a variable magnification optical system according to a fifth Example of the present application.

The variable magnification optical system according to the present fifth Example is composed of, in order from an object side along the optical axis, a first lens group G1 having positive refractive power, a second lens group G2 having negative refractive power, an aperture stop S, a third lens group G3 having positive refractive power, a fourth lens group G4 having negative refractive power, and a fifth lens group G5 having positive refractive power.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a double convex positive lens L23, and a double concave negative lens L24. The negative meniscus lens L21 of the second lens group G2 has an object side lens surface provided with a thin layer of plastic resin formed into an aspherical shape.

The third lens group G3 consists of a cemented positive lens constructed by a double convex positive lens 31 cemented with a negative meniscus lens L32 having a concave surface facing the object side. The positive lens L31 of the third lens group G3 has an object side lens surface formed into an aspherical shape.

The fourth lens group G4 consists of, in order from the object side along the optical axis, a double convex positive lens L41, and a cemented negative lens constructed by a double concave negative lens L42 cemented with a positive meniscus lens L43 having a convex surface facing the object side. The negative lens L42 of the fourth lens group G4 has an object side lens surface formed into an aspherical shape.

The fifth lens group G5 consists of, in order from the object side along the optical axis, a cemented positive lens constructed by a negative meniscus lens L51 having a convex surface facing the object side cemented with a double convex positive lens L52, and a cemented positive lens constructed by a double convex positive lens L53 cemented with a negative meniscus lens L54 having a concave surface facing the object side.

In the variable magnification optical system according to the present fifth Example, each lens group of the first lens group G1 to the fifth lens group G5 is moved to the side of an object such that, upon zooming from a wide angle end state to a telephoto end state, an air distance between the first lens group G1 and the second lens group G2 is increased, an air distance between the second lens group G2 and the third lens group G3 is decreased, an air distance between the third lens group G3 and the fourth lens group G4 is increased, and an air distance between the fourth lens group G4 and the fifth lens group G5 is decreased. At that time, the aperture stop S is moved together with the fourth lens group G4.

In the variable magnification optical system according to the present Example, the third lens group G3 is moved toward the image plane side to thereby conduct focusing from an infinite distance object point to a close distance object point.

In the variable magnification optical system according to the present Example, the cemented negative lens of the negative lens L42 and positive meniscus lens L43 in the fourth lens group G4 is moved in a direction including a directional component perpendicular to the optical axis. Consequently, the displacement of imaging position which may be caused by a camera shake or the like is corrected.

Values of specifications for the variable magnification optical system according to the present fifth Example are shown in Table 11 given below.

TABLE 11

[Surface Date]

| m | r | d | nd | vd |
|---|---|---|---|---|
| op | ∞ | | | |
| 1 | 182.4197 | 2.000 | 1.84666 | 23.80 |
| 2 | 65.9296 | 8.477 | 1.59319 | 67.90 |
| 3 | −251.6345 | 0.100 | | |
| 4 | 62.6306 | 5.205 | 1.81600 | 46.62 |
| 5 | 216.8104 | d5 | | |
| 6* | 500.0000 | 0.150 | 1.55389 | 38.23 |
| 7 | 317.0099 | 1.200 | 1.81600 | 46.59 |
| 8 | 14.2613 | 4.974 | | |
| 9 | −58.5533 | 1.000 | 1.81600 | 46.62 |
| 10 | 42.1167 | 0.500 | | |
| 11 | 25.4178 | 5.399 | 1.84666 | 23.78 |
| 12 | −29.8839 | 0.371 | | |
| 13 | −25.9080 | 1.000 | 1.88300 | 40.76 |
| 14 | 102.0955 | d14 | | |
| 15 (Stop) | ∞ | d15 | | |
| 16* | 25.9625 | 5.241 | 1.60300 | 65.44 |
| 17 | −25.0195 | 1.000 | 1.85026 | 32.35 |
| 18 | −71.4459 | d18 | | |
| 19 | 131.4303 | 4.270 | 1.49782 | 82.51 |
| 20 | −26.9040 | 2.500 | | |
| 21* | −76.8762 | 1.400 | 1.82124 | 43.55 |
| 22 | 22.2058 | 2.400 | 1.84666 | 23.78 |
| 23 | 36.3161 | d23 | | |
| 24 | 187.1289 | 1.300 | 1.82674 | 25.92 |
| 25 | 98.6389 | 3.596 | 1.69966 | 53.90 |
| 26 | −58.9299 | 0.100 | | |
| 27 | 40.1643 | 7.682 | 1.54032 | 53.56 |
| 28 | −18.8168 | 1.300 | 1.90265 | 35.70 |
| 29 | −70.7430 | BF | | |
| I | ∞ | | | |

[Aspherical Surface Data]

6th Surface

κ = 11.2598
A4 = 7.62346E−06
A6 = −1.78269E−08
A8 = 8.46129E−11
A10 = −2.47130E−13

16th Surface

κ = −0.0666
A4 = −1.51323E−05
A6 = −3.60576E−08
A8 = 3.25380E−11
A10 = 0.00000E+00

TABLE 11-continued

| 21th Surface |
|---|
| κ = 0.6725 |
| A4 = 6.45447E−06 |
| A6 = 2.78317E−08 |
| A8 = 2.78317E−08 |
| A10 = 0.00000E+00 |

[Various Date]
Variable magnification ratio 7.56

|  | W | M | T |
|---|---|---|---|
| f | 18.5 | 70.2 | 139.8 |
| FNO | 3.47 | 5.29 | 5.88 |
| 2ω | 78.06 | 22.16 | 11.24 |
| Ymax | 14.25 | 14.25 | 14.25 |
| TL | 143.30 | 185.46 | 201.71 |
| BF | 38.00 | 73.20 | 79.61 |

[Variable Distance Date]

|  | Infinite focusing state | | | Close distance focusing state | | |
|---|---|---|---|---|---|---|
|  | W | M | T | W | M | T |
| d5 | 1.500 | 27.734 | 42.208 | 1.500 | 27.734 | 42.208 |
| d14 | 21.546 | 6.826 | 3.000 | 21.546 | 6.826 | 3.000 |
| d15 | 7.716 | 3.829 | 2.000 | 8.222 | 4.219 | 2.648 |
| d18 | 3.009 | 6.895 | 8.724 | 2.502 | 6.506 | 8.076 |
| d23 | 10.365 | 5.813 | 5.000 | 10.365 | 5.813 | 5.000 |

[Lens Group Date]

|  | ST | f |
|---|---|---|
| G1 | 1 | 80.001 |
| G2 | 6 | −13.280 |
| G3 | 16 | 40.000 |
| G4 | 19 | −125.226 |
| G5 | 24 | 44.290 |

[Values for Conditional Expressions]

(4) f3/ft = 0.286
(5) (−f3)/f2 = 3.012
(6) nN − nP = 0.247
(7) νP − νN = 33.09
(8) f1/fw = 4.325
(9) (−f4)/f5 = 2.827
(10) (D45w − D45t)/fw = 0.290

Figure 14A:
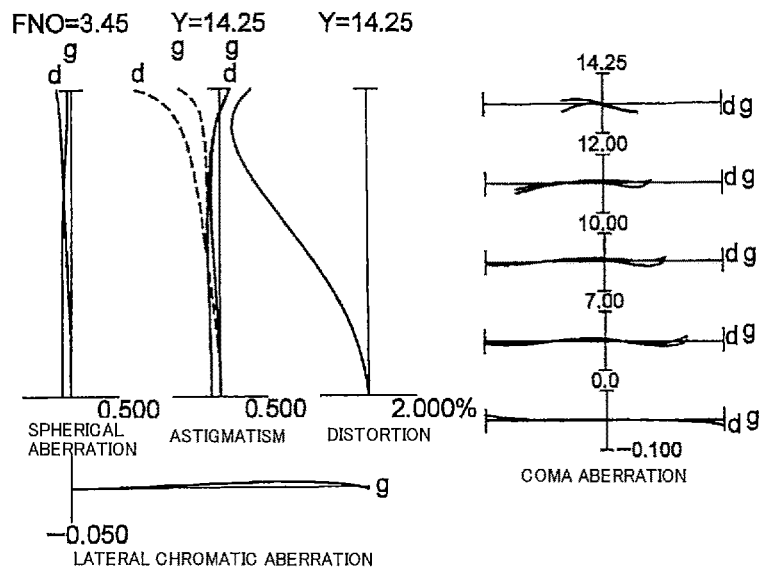
FIGS. 14A, 14B and 14C are graphs showing various aberrations of the variable magnification optical system according to the Fifth Example upon focusing on infinity, in a wide-angle end state, in an intermediate focal length state, and in a telephoto end state, respectively.
Figure 14B:
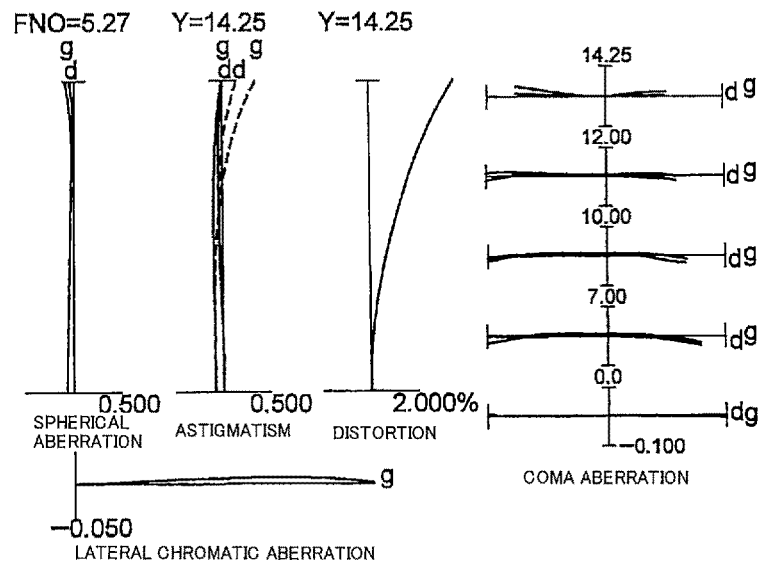
Figure 14C:
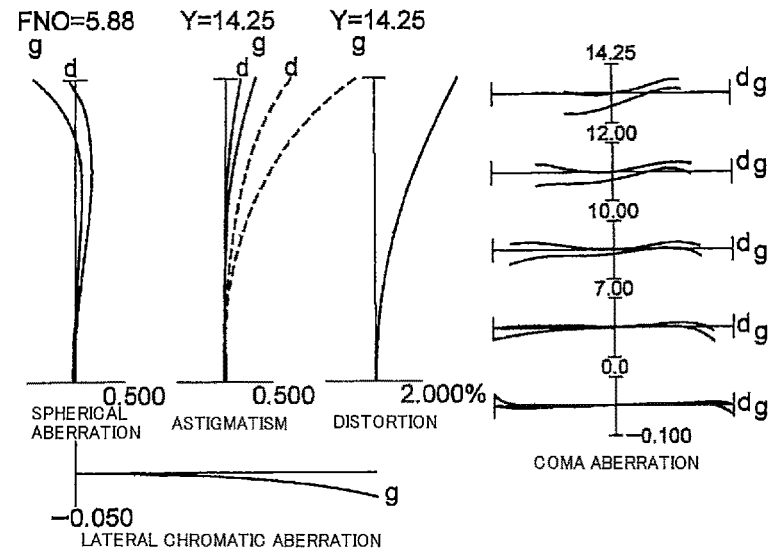

FIGS. 14A, 14B and 14C are graphs showing various aberrations of the variable magnification optical system according to the fifth Example of the present application upon focusing on infinity, in the wide angle end state, in the intermediate focal length state, and in the telephoto end state, respectively.

Figure 15A:
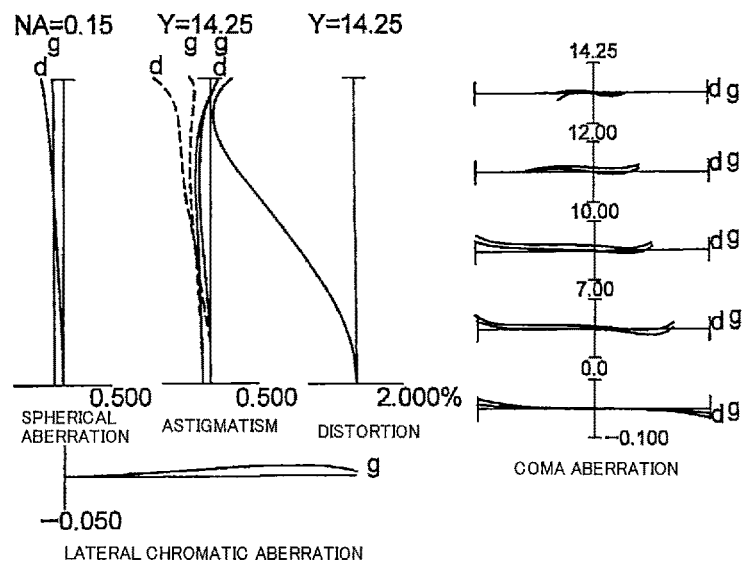
FIGS. 15A, 15B and 15C are graphs showing various aberrations of the variable magnification optical system according to the Fifth Example upon focusing on a close distance object, in a wide-angle end state, in an intermediate focal length state, and in a telephoto end state, respectively.
Figure 15B:
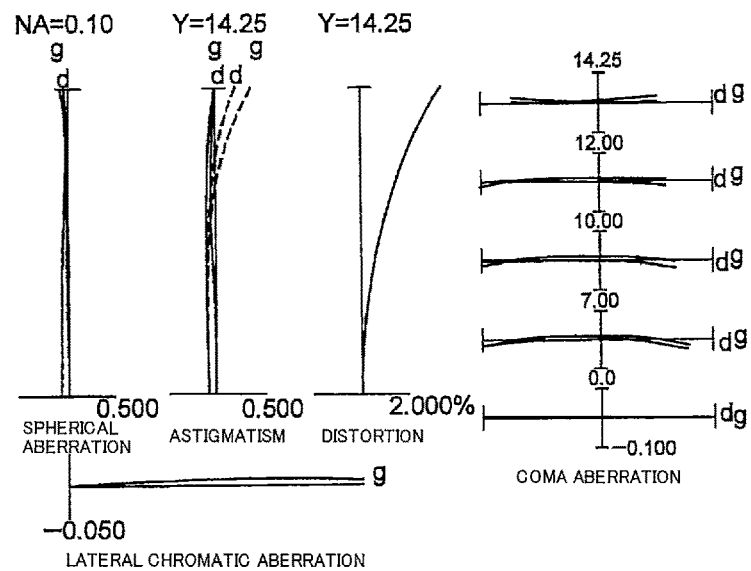
Figure 15C:
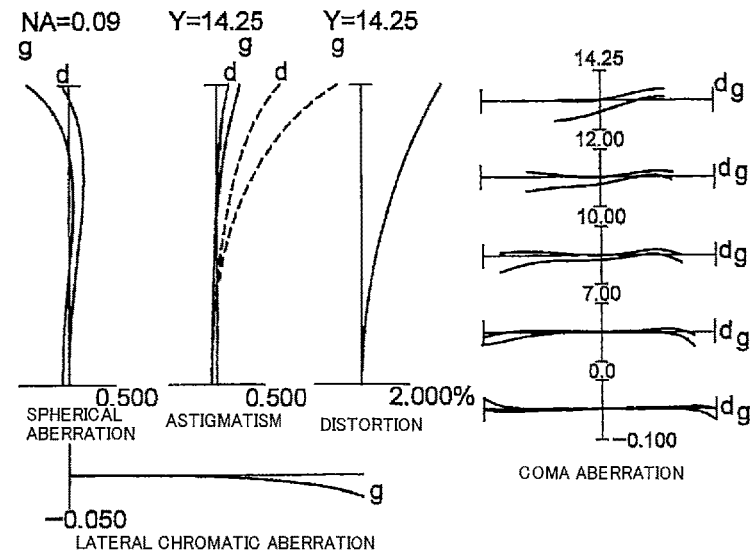

FIGS. 15A, 15B and 15C are graphs showing various aberrations of the variable magnification optical system according to the fifth Example of the present application upon focusing on a close distance object, in the wide angle end state, in the intermediate focal length state, and in the telephoto end state, respectively.

As is seen from the aberration graphs, the variable magnification optical system according to the present Example shows superb imaging performance as a result of a good correction of various aberrations in the range from the wide-angle end state to the telephoto end state and provides superior imaging performance also upon focusing on a close distance object.

According to the above Examples, the focusing lens group is downsized and made lighter, and thus, it is possible to provide a variable magnification optical system which enables the realization of high speed and good quietness auto focusing without increasing the size of the barrel and which also enables good suppression of the variation in aberrations upon zooming from the wide-angle end state to the telephoto end state and good suppression of the variation in aberrations upon focusing from the infinite distance object point to the close distance object point.

What is claimed is:

1. A variable magnification optical system comprising, in consecutive order from an object side:
a first lens group having positive refractive power;
a second lens group having negative refractive power;
a third lens group having positive refractive power;
a fourth lens group; and
a subsequent lens group comprising at least one lens group;
upon zooming from a wide-angle end state to a telephoto end state, a distance between the first lens group and the second lens group being varied, a distance between the second lens group and the third lens group being varied, a distance between the third lens group and the fourth lens group being varied, a distance between the fourth lens group and the subsequent lens group being varied, and when the subsequent lens group comprises a plurality of lens groups, each distance between the plurality of lens groups being varied;
upon focusing from infinity to a close distance object, the third lens group being moved along an optical axis, and the following conditional expression being satisfied:

$$0.60 < f3/f4 < 1.30$$

$$3.00 < f1/fw < 6.00$$

where f3 denotes a focal length of the third lens group, f4 denotes a focal length of the fourth lens group, f1 denotes a focal length of the first lens group, and fw denotes a focal length of the whole system in the wide-angle end state.

2. The variable magnification optical system according to claim 1, wherein the fourth lens group has positive refractive power.

3. The variable magnification optical system according to claim 1, wherein upon zooming from the wide-angle end state to the telephoto end state, the first lens group is moved toward the object side.

4. The variable magnification optical system according to claim 1, wherein upon zooming from the wide-angle end state to the telephoto end state, the distance between the first lens group and the second lens group is increased, the distance between the second lens group and the third lens group is decreased, the distance between the third lens group and the fourth lens group is increased, and the distance between the fourth lens group and the subsequent lens group is increased.

5. The variable magnification optical system according to claim 1, wherein the third lens group is composed solely of one positive lens, or of one cemented lens having positive refractive power.

6. The variable magnification optical system according to claim 1, wherein the third lens group has a most object side surface formed into an aspherical surface.

7. The variable magnification optical system according to claim 6, wherein the aspherical surface is in a shape in which the positive refractive power is weakened with increasing distance from the optical axis.

8. The variable magnification optical system according to claim 1, wherein the following conditional expression is satisfied:

$$0.11<(-f2)/f1<0.19$$

where f2 denotes a focal length of the second lens group, and f1 denotes a focal length of the first lens group.

9. The variable magnification optical system according to claim 1, wherein at least a part of the subsequent lens group is moved so as to have a component in a direction perpendicular to the optical axis.

10. The variable magnification optical system according to claim 1, wherein the subsequent lens group consists of a fifth lens group having negative refractive power and a sixth lens group having positive refractive power.

11. An optical apparatus equipped with a variable magnification optical system according to claim 1.

12. A variable magnification optical system comprising, in consecutive order from an object side along an optical axis: a first lens group having positive refractive power; a second lens group having negative refractive power; a third lens group having positive refractive power; a fourth lens group having negative refractive power; and a fifth lens group having positive refractive power; and
upon zooming from a wide-angle end state to a telephoto end state, a distance between the first lens group and the second lens group being varied, a distance between the second lens group and the third lens group is varied, a distance between the third lens group and the fourth lens group is varied, a distance between the fourth lens group and the fifth lens group being varied, and the first lens group is moved to the object side;
upon focusing from an infinite distance object point to a close distance object point, the third lens group being moved, and
the following conditional expressions being satisfied:

$$0.26<f3/ft<0.35$$

$$2.60<(-f3)/f2<3.60$$

where f2 denotes a focal length of the second lens group, f3 denotes a focal length of the third lens group, and ft denotes a focal length of the whole system in the telephoto end state.

13. The variable magnification optical system according to claim 12, wherein upon zooming from the wide-angle end state to the telephoto end state, the distance between the first lens group and the second lens group is increased, and the distance between the second lens group and the third lens group is decreased.

14. The variable magnification optical system according to claim 12, wherein upon zooming from the wide-angle end state to the telephoto end state, the fourth lens group and the fifth lens group are moved toward the object side.

15. The variable magnification optical system according to claim 12, wherein upon zooming from the wide-angle end state to the telephoto end state, the distance between the third lens group and the fourth lens group is increased, and the distance between the fourth lens group and the fifth lens group is decreased.

16. The variable magnification optical system according to claim 12, wherein the third lens group is composed of a cemented lens constructed of, in order from an object side along an optical axis, a double convex positive lens cemented with a negative meniscus lens having a concave surface facing the object side.

17. The variable magnification optical system according to claim 16, wherein the following conditional expression is satisfied:

$$0.15<nN-nP<0.45$$

where nN denotes a refractive index of the negative meniscus lens, and nP denotes a refractive index of the double convex positive lens.

18. The variable magnification optical system according to claim 16, wherein the following conditional expression is satisfied:

$$25.00<\upsilon P-\upsilon N<45.00$$

where $\upsilon P$ denotes an Abbe number of the double convex positive lens, and $\upsilon N$ denotes an Abbe number of the negative meniscus lens.

19. The variable magnification optical system according to claim 12, wherein the following conditional expression is satisfied:

$$3.50<f1/fw<5.30$$

where f1 denotes a focal length of the first lens group, and fw denotes a focal length of the whole system in the wide-angle end state.

20. The variable magnification optical system according to claim 12, wherein the following conditional expression is satisfied:

$$2.00<(-f4)/f5<4.00$$

where f4 denotes a focal length of the fourth lens group, and f5 denotes a focal length of the fifth lens group.

21. The variable magnification optical system according to claim 12, wherein the following conditional expression is satisfied:

$$0.15<(D45w-D45t)/fw<0.40$$

where D45w denotes a distance between the fourth lens group and the fifth lens group in the wide-angle end state, D45t denotes a distance between the fourth lens group and the fifth lens group in the telephoto end state, and fw denotes a focal length of the whole system in the wide-angle end state.

22. The variable magnification optical system according to claim 12, wherein the third lens group has a most object side surface formed into an aspherical surface.

23. The variable magnification optical system according to claim 12, wherein at least a part of the fourth lens group is moved in a direction including a directional component perpendicular to the optical axis, making a correction of an image blur.

24. An optical apparatus equipped with the variable magnification optical system according to claim 12.

25. A method for manufacturing a variable magnification optical system A comprising, in consecutive order from an object side: a first lens group having positive refractive power; a second lens group having negative refractive power; a third lens group having positive refractive power; a fourth lens group; and a subsequent lens group comprising at least one lens group; or
a variable magnification optical system comprising, in consecutive order from an object side along an optical axis: a first lens group having positive refractive power; a second lens group having negative refractive power; third lens group having positive refractive power; a fourth lens group having negative refractive power; and a fifth lens group having positive refractive power;
the method of the variable magnification optical system A comprising the steps of:

disposing the lens groups such that, upon zooming from a wide-angle end state to a telephoto end state, a distance between the first lens group and the second lens group is varied, a distance between the second lens group and the third lens group is varied, a distance between the third lens group and the fourth lens group is varied, a distance between the fourth lens group and the subsequent lens group is varied, and when the subsequent lens group comprises a plurality of lens groups, each distance between the plurality of lens groups is varied;

disposing the third lens group so as to move along an optical axis upon focusing from infinity to a close distance object; and configuring the lens groups such that the following conditional expressions are satisfied:

$$0.60 < f3/f4 < 1.30$$

$$3.00 < f1/fw < 6.00$$

where f3 denotes a focal length of the third lens group, f4 denotes a focal length of the fourth lens group, f1 denotes a focal length of the first lens group, and fw denotes a total length of the whole system in the wide-angle end state;

the method of the variable magnification optical system B comprising the steps of:

disposing the lens groups such that, upon zooming from a wide-angle end state to a telephoto end state, a distance between the lens group and the second lens group is varied, a distance between the second lens group and the third lens group is varied, a distance between the third lens group and the fourth lens group is varied, a distance between the fourth lens group and the fifth lens group is varied, and the first lens group is moved toward the object side;

arranging the third lens group so as to move upon focusing from an infinite distance object point to a close distance object point; and configuring the lens groups such that the following conditional expressions are satisfied:

$$0.26 < f3/ft < 0.35$$

$$2.60 < (-f3)/f2 < 3.60$$

where f2 denotes a focal length of the second lens group, f3 denotes a focal length of the third lens group, and ft denotes a focal length of the whole system in the telephoto end state.

* * * * *